US011424556B2

(12) United States Patent
Reichert

(10) Patent No.: US 11,424,556 B2
(45) Date of Patent: Aug. 23, 2022

(54) SPRING CLIP FOR PRODUCING AN ELECTRICAL AND MECHANICAL CONNECTION BETWEEN CONTACT PARTNERS

(71) Applicant: ZF Friedrichshafen AG, Friedrichshafen (DE)

(72) Inventor: Heinz Reichert, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 346 days.

(21) Appl. No.: 16/300,339

(22) PCT Filed: Apr. 27, 2017

(86) PCT No.: PCT/EP2017/060103
§ 371 (c)(1),
(2) Date: Nov. 9, 2018

(87) PCT Pub. No.: WO2017/194323
PCT Pub. Date: Nov. 16, 2017

(65) Prior Publication Data

US 2019/0148845 A1 May 16, 2019

(30) Foreign Application Priority Data

May 13, 2016 (DE) .................... 10 2016 208 291.4

(51) Int. Cl.
*H01R 4/48* (2006.01)
*H01R 12/51* (2011.01)
(Continued)

(52) U.S. Cl.
CPC ............ *H01R 4/48* (2013.01); *H01R 12/515* (2013.01); *H01R 13/508* (2013.01); *H01R 43/027* (2013.01)

(58) Field of Classification Search
CPC ...... H01R 4/48; H01R 12/515; H01R 43/027; H01R 13/508
See application file for complete search history.

(56) References Cited

U.S. PATENT DOCUMENTS 2,766,438 A * 10/1956 Kohler .................... H01R 4/48 439/861
2,997,685 A 8/1961 Anderson
(Continued)

FOREIGN PATENT DOCUMENTS

DE 2011 5100 U1 11/2001
DE 100 57 140 A1 6/2002
(Continued)

OTHER PUBLICATIONS

International Search Report and Written Opinion of the International Search Authority in International PCT Application No. PCT/EP2017/060103, dated Jun. 28, 2017 (German language) (17 pages).
(Continued)

*Primary Examiner* — Jeffrey T Carley
(74) *Attorney, Agent, or Firm* — Crowell & Moring LLP

(57) ABSTRACT

A spring clip for securing contact partners is presented, wherein the contact partners can be connected electrically and in a form fitting manner. The spring clip has a socket section with at least one guide lug for a form fitting connection to a first contact partner, a snap-fit section with at least one snap-fit hook that snaps into a second contact partner, and a bending section between the socket section and the snap-fit section. The bending section can be bent thereby, between a relaxed state and a tensioned state.

14 Claims, 31 Drawing Sheets

(51) Int. Cl.
*H01R 13/508* (2006.01)
*H01R 43/027* (2006.01)

(56) References Cited

U.S. PATENT DOCUMENTS

| | | | | | |
|---|---|---|---|---|---|
| 4,072,387 | A * | 2/1978 | Sochor | H01R 12/714 | 439/329 |
| 4,402,118 | A * | 9/1983 | Benedetti | F16B 5/065 | 24/289 |
| 5,098,150 | A * | 3/1992 | Smith | B60J 3/0282 | 16/296 |
| 6,750,402 | B2 * | 6/2004 | Geske | H01R 4/4845 | 174/135 |
| 7,780,468 | B1 * | 8/2010 | Bishop | H01R 4/4818 | 439/441 |
| 9,543,668 | B2 * | 1/2017 | Wendt | H01R 4/5008 | |
| 9,559,440 | B2 * | 1/2017 | Wendt | H01R 4/5008 | |
| 9,831,568 | B2 * | 11/2017 | Giefers | H01R 4/4809 | |
| 2005/0282444 | A1 * | 12/2005 | Irish | H01R 11/22 | 439/853 |
| 2008/0128164 | A1 * | 6/2008 | Johnson | H02G 3/0691 | 174/660 |
| 2011/0076900 | A1 * | 3/2011 | Keswani | H01R 4/4818 | 439/787 |
| 2013/0064625 | A1 * | 3/2013 | Spitz | F16B 37/0842 | 411/516 |

FOREIGN PATENT DOCUMENTS

| | | | | |
|---|---|---|---|---|
| DE | 10 2006 014 889 | A1 | 10/2006 | |
| DE | 10 2008 048 087 | A1 | 4/2010 | |
| DE | 10 2011 085 704 | A1 | 5/2013 | |
| DE | 10 2012 206 731 | A1 | 10/2013 | |
| EP | 0802580 | A1 * | 10/1997 | H01R 4/38 |
| EP | 1 555 724 | A1 | 7/2005 | |

OTHER PUBLICATIONS

International Search Report of the International Search Authority in International PCT Application No. PCT/EP2017/060103, dated Jun. 28, 2017 (English Tanguage) (2 pages).
German Search Report and Office Action dated May 29, 2017 for German Patent Application No. 10 2016 208 291.4 (10 pages).
English translation of p. 9 of German Search Report and Office Action dated May 29, 2017 for German Patent Application No. 10 2016 208 291.4 (2 pages).

* cited by examiner

SPRING CLIP FOR PRODUCING AN ELECTRICAL AND MECHANICAL CONNECTION BETWEEN CONTACT PARTNERS

RELATED APPLICATIONS

This application claims the benefit under 35 U.S.C. § 371 of the filing date of International Patent Application PCT/EP2017/060103, having an international filing date of Apr. 27, 2017, which claims the benefit of and priority to German Patent Application DE 10 2016 208 291.4, filed on May 13, 2016, both of which are incorporated by reference herein in their entirety.

BACKGROUND

1. Technical Field

The present invention relates to a spring clip for securing contact partners, a connecting system for producing an electrical and mechanical connection between contact partners, an assembly tool for securing contact partners, and a method for securing contact partners.

2. Background Information

Terminal lugs or contact bars, or so-called bus bars, can normally be connected by means of screw constructions or a screw contact. To prevent loosening of such screws, e.g. through vibration, a tensioning force can be increased. Materials that have a higher electrical conductivity may display a lower stability, reducing the slippage resistance and setting behavior. A setting of the material could reduce tension to a certain extent, and the screw could loosen when subjected to extreme loads, e.g. vibrations, etc.

DE 100 57 140 A1 discloses a high current connection between at least two individually installed electrical components at a spacing to one another.

Based on this, the present invention provides an improved spring clip for securing contact partners, an improved connecting system for producing an electrical and mechanical connection between contact partners, an improved assembly tool for securing contact partners and an improved method for securing contact partners in accordance with the independent claims. Advantageous configurations can be derived from the dependent claims and the following description.

BRIEF SUMMARY

A method and a device, in particular, for the electrical connection of highly conductive materials, can be provided according to embodiments of the present invention. A mechanical and electrical connection of highly conductive materials, or two electric contact partners, can be produced thereby, for example. Contact partners can be form fit to one another for this, thus forming an electrical connection, by means of a spring clip.

A clamping load to conductor materials of the contact partners, for example, can advantageously be reduced, in particular in comparison with screw contacts, according to embodiments of the present invention. Contact partners made of soft, highly conductive materials can thus be connected to one another, for example. Due to the reduced load and a high elasticity of the spring clip, a setting of the material, and thus a loosening of the electric connection can also be prevented or minimized, in particular. Negligent handling can also be detected and additionally or alternatively be prevented as a result of the proposed means of securing and the mechanical and electrical connection. Safety can thus be increased, in particular, and it may be possible to detect when the electrical connection is improperly connected, e.g. through self-construction or suchlike. Furthermore, structural size can be reduced with the spring clip, in particular in comparison with a screw contact. A light and compact structure can thus be obtained, for example, because, in contrast to a screw contact, there is no need to accommodate a thread length, elongation length, or screw head.

A spring clip for securing contact partners, wherein the contact partners can be connected electrically and in a form fitting manner to one another, comprises a socket section with at least one guide lug, that is connected in a form fitting manner to a first contact partner, a snap-fit section with at least one snap-fit hook that snaps into a second contact partner, and a bending section between the socket section and the snap-fit section, wherein the bending section can be bent between a relaxed state and a tensioned state.

The spring clip is preferably shaped such that it has a first, in particular V-shaped cross section in the relaxed state, and a second (thus different than the first), in particular U-shaped cross section in the tensioned state. In other words, the socket section and snap-fit section are at a first angle to one another in the relaxed state. In the tensioned state, the socket section and snap-fit section are then at a second angle to one another, different to the first angle. In the tensioned state, the socket section and snap-fit section can be parallel, in particular, thus at an angle of 0°. In the relaxed state, the socket section and snap-fit section can be at an angle greater than 0° to one another.

Either or both the socket section and snap-fit section can be substantially straight, in particular thus forming a flat surface. Either or both the socket section and snap-fit section can also be curved, e.g. convex or concave, thus forming a curved surface. The socket section and snap-fit section can also be complementary to one another, e.g. one can be concave, and the other convex.

The socket section and snap-fit section are spaced apart in both the tensioned state and the relaxed state. The socket section and snap-fit section can thus simply be brought together such that the snap-fit hook is tightened and snapped into position.

The bending section is preferably C-shaped. A tensioning of the bending section can thus be maintained in the tensioned state. The snap-fit and socket sections are then formed on the ends of the C-shape. The height of the C-shaped bending section preferably then determines the spacing between the socket section and the snap-fit section.

The spring clip can be made of a metallic material, a material that contains metal, etc. The first contact partner can be, e.g., a contact bar, a so-called bus bar, a terminal lug, a through bar, an end bar, etc. The second contact partner can be a socket. The socket can be attached to a carrier element, a housing, or an assembly. When the contact partners are secured by means of the spring clip, the first contact partner can be located between the second contact partner and the spring clip.

According to one embodiment, the at least one guide lug can be formed on a side of the socket section facing away from the snap-fit section. The at least one snap-fit hook can be formed on a side of the snap-fit section facing toward the socket section. The at least one snap-fit hook can extend beyond the socket section, at least when the bending section is tensioned. In other words, the at least one snap-fit hook can extend beyond the extension of the socket section, at least when the bending section is tensioned, wherein the at least one snap-fit hook can intersect the plane of extension of the side of the socket section. In particular, the at least one snap-fit hook can partially encompass the socket section when the bending section is tensioned. Such an embodiment offers the advantage that it is possible to secure two contact partners to one another simply, securely and quickly.

The socket section can also have at least one coupling section for a form fitting connection with a coupling section of the first contact partner or the second contact partner. The coupling section can be a through hole, a recess, and/or a projection thereby. Such an embodiment offers the advantage that a form fitting connection can be obtained between the socket section, and thus the spring clip, and one of the contact partners, which is reliable and will not slip.

Furthermore, the at least one snap-fit hook can have a through hole that can be coupled to an assembly tool for deflecting the at least one snap-fit hook. The through hole can be circular, oval or elongated, in the form of a slot. Such an embodiment has the advantage that a securing procedure with the spring clip can be sped up and simplified with such snap-fit hooks, wherein the securing procedure is also gentle on the contact partners, and can be executed with less effort.

In particular, the at least one snap-fit hook can have a hook section that is bent at least at a right angle. In other words, the at least one snap-fit hook can be bent at a right or acute angle in the region of the hook section. Such an embodiment has the advantage that a seating or retention of the at least one snap-fit hook on or in the second contact partner is reinforced and secured.

Furthermore, the at least one guide lug can have an angled end section. The at least one guide lug can exhibit an L-shaped or obtuse angled cross section. Such an embodiment has the advantage that a reliable and simple canting and slipping safeguard can be obtained or improved for the spring clip in relation to the contact partners.

According to one embodiment, the at least one guide lug can be located on an end of the socket section facing away from the bending section. A least one snap-fit hook can be located on each of two opposite sides of the snap-fit section. Such an embodiment has the advantage that contact bars, or so-called bus bars, and terminal lugs serving in particular as the first contact partner, can be reliably, securely and simply secured to the second contact partner.

According to another embodiment, the at least one snap-fit hook can be located on an end of the snap-fit section facing away from the bending section. At least one guide lug can be located on each of two opposite sides of the socket section. Such an embodiment has the advantage that the first contact partner, in the form of a bus bar or end bar, can be reliably, securely and easily secured to the second contact partner.

The socket section can also have numerous guide lugs. The planes of extension of the guide lugs can be aligned parallel and, additionally or alternatively, orthogonal to one another. Such an embodiment has the advantage that special shapes of first contact partners, such as terminal lugs, bus bars or end bars, can be taken into account and reliably secured.

A connecting system for producing an electrical and mechanical connection between contact partners comprises an embodiment of the aforementioned spring clip, the first contact partner and the second contact partner, wherein the first contact partner and the second contact partner can be connected to one another electrically and in a form fitting manner, wherein the first contact partner and the second contact partner can be mechanically secured to one another by means of the spring clip, wherein the first contact partner is located between the second contact partner and the spring clip in the mechanically secured state.

An embodiment of the aforementioned spring clip can be advantageously used in the connecting system to secure the contact partners to one another.

According to one embodiment, the first contact partner or the second contact partner can have at least one coupling section for a form fitting connection to a coupling section of the socket section of the spring clip. The one coupling section can be formed as a through hole, a recess, or additionally or alternatively, as a projection, that is complementary to the other coupling section. Such an embodiment has the advantage that the form fitting connection between one of the contact partners and the spring clip is robust and will not slip.

The first contact partner can also have at least one first connecting section, and the second contact partner can have at least one second connecting section. The at least one first connecting section and the at least one second connecting section can be complementary, such that they can be connected in a form fitting manner. Such an embodiment has the advantage that a mechanical connection can be formed in a simple and reliable manner between the contact partners.

The at least one first connecting section and the at least one second connection section can be shaped as complementary recesses and projections thereby. The cross sections of the at least one first connecting section and the at least one second connecting section can be rectangular or in the shape of a truncated cone. In particular, the cross sections of the at least one first connecting section and the at least one second connecting section can be shaped such that they are wedged into one another. Such an embodiment has the advantage that the form fitting connection between the contact partners can be reliably and securely obtained with less effort.

An assembly tool for securing the contact partners is also presented, wherein the contact partners can be electrically connected to one another in a form fitting manner, wherein an embodiment of the aforementioned spring clip can be accommodated in the assembly tool, wherein the assembly tool has at least one first lever for deflecting the at least one snap-fit hook of the snap-fit section of the spring clip, and at least one second lever for tensioning the bending section of the spring clip.

The assembly tool can be advantageously used or utilized for installing an embodiment of the aforementioned spring clip, in order to secure the contact partners to one another.

A method for securing contact partners to one another is also presented, wherein the method can be executed in conjunction with a spring clip that has at least one socket section with at least one guide lug for a form fitting connection with a first contact partner, a snap-fit section with at least one snap-fit hook that hooks into a second contact partner, and bending section between the socket section and the snap-fit section, wherein the bending section can be bent between a relaxed state and a tensioned state, wherein the spring clip preferably has a V-shaped cross section in the relaxed state, and a U-shaped cross section in the tensioned state, wherein the method comprises the following steps:

Placement of the spring clip with the socket section on the first contact partner, which is connected to the second contact partner electrically and in a form fitting manner, in order to obtain a form fitting connection between the at least one guide lug of the socket section of the spring clip and the first contact partner; and Deflection the at least one snap-fit hook of the snap-fit section of the spring clip, such that it snaps into the second contact partner, wherein the bending section of the spring clip is or becomes tensioned.

The contact partners can be secured, in particular to one another, by executing the method, using an embodiment of the aforementioned spring clip and additionally or alternatively using an embodiment of the aforementioned assembly tool.

In particular, an assembly of the spring clip by means of an embodiment of the aforementioned assembly tool, and additionally or alternatively the method, can take place in a gentle manner, with less effort. Furthermore, there is no need for an assembly brace or a torque brace as is the case with a screw contact. As a result, the assembly force no longer needs to be absorbed by a support structure. Such an assembly can thus be carried out more easily and with less effort. In particular, the assembly can be simplified, and safety can be increased using the assembly tool and additionally or alternatively, executing the method for securing. Furthermore, it is practically impossible to mistakenly use the wrong spring clip, because only the right spring clip will fit, as with a key. The spring clip must only be checked that it is in the right orientation. It is not necessary to monitor the force that is used, or to monitor the torque or angular position, as is the case with a screw connection.

BRIEF DESCRIPTION OF THE DRAWINGS

The invention shall now be explained in greater detail based on the attached drawings. Therein.

DETAILED DESCRIPTION OF THE DRAWINGS AND THE PRESENTLY PREFERRED EMBODIMENTS

In the following description of preferred exemplary embodiments of the present invention, the same or similar reference symbols shall be used for the elements depicted in the various drawings that have similar functions, wherein there shall be no repetition of the descriptions of these elements.

Figure 1:
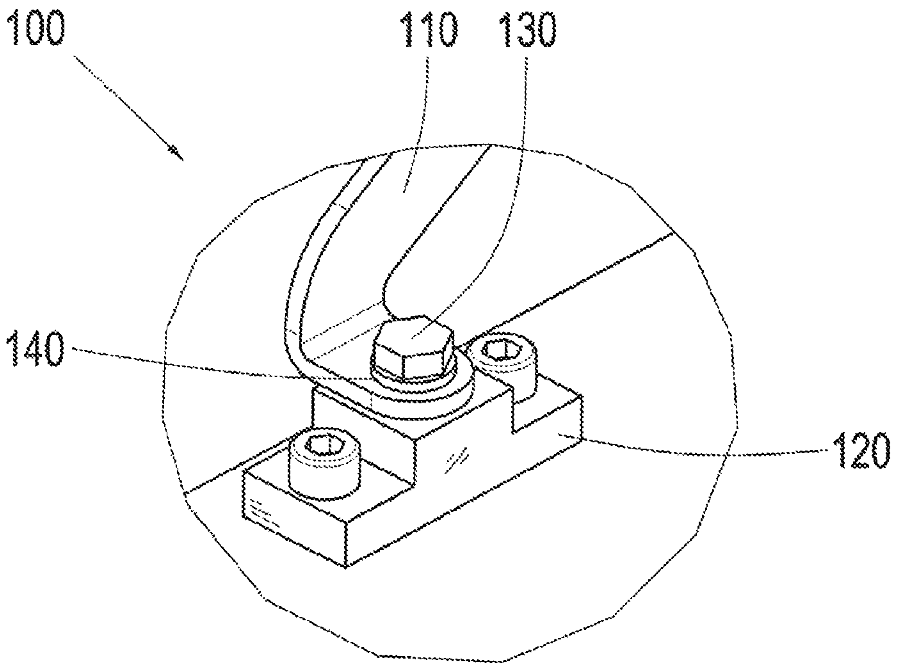
FIG. 1 shows a perspective view of a screw contact.

FIG. 1 shows a perspective illustration of a screw contact 100. The screw contact 100 has a first contact partner 110, a second contact partner 120, a screw 130, and a washer 140.

The first contact partner 110 and the second contact partner 120 are secured to one another by means of the screw 130 and the washer 140.

Figure 2:
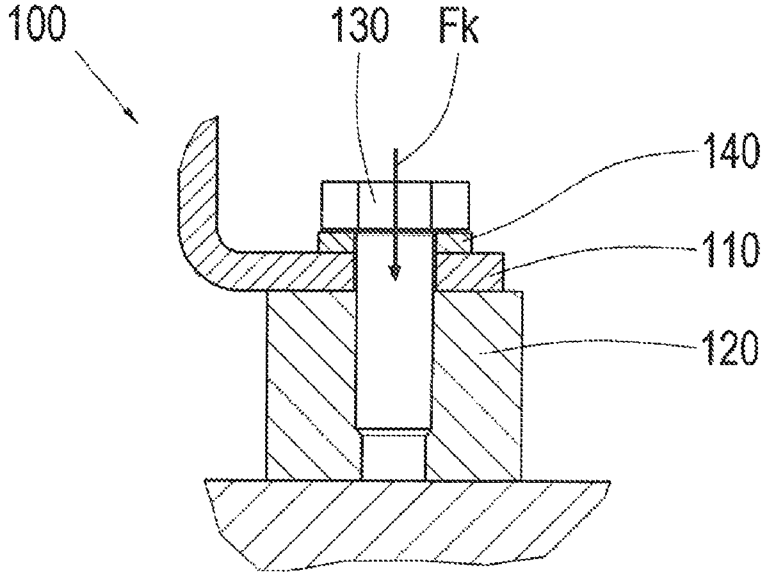
FIG. 2 shows a schematic sectional view of the screw contact from FIG. 1.

FIG. 2 shows a schematic sectional view of the screw contact 100 in FIG. 1. It can be seen therein how the screw 130 is screwed through the first contact partner 110 into the second contact partner 120. There is a force, or contact force Fk, of just approx. 10 kN, for example, with an M6 screw. The first contact partner 110 and the second contact partner 120 are each made with a material displaying higher current conductivity and greater stability.

Figure 3:
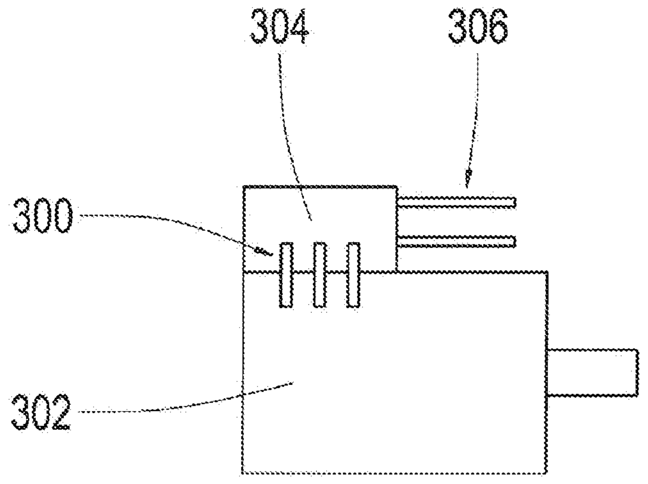
FIG. 3 shows a schematic illustration of an exemplary application of a releasable electrical connection.

FIG. 3 shows a schematic illustration of an exemplary application of a releasable electrical connection 300. An electric machine, E-machine 302, is shown, that is connected to the power electronics 304 via the electrical connection 300. A high voltage cable connection 306 is provided at the power electronics 304. The electric machine 302 is provided for or incorporated in a motor vehicle, by way of example.

The electrical connection shown in FIG. 3 depicts a connecting system from the following figures, by way of example. It should be noted with respect to electrical connections that with the effects of electrical conductivity on a bus bar, for example, a reduction of even a few watts can be advantageous, because the effort for cooling the electronics can be reduced, and the energy efficiency of a vehicle drive chain, and thus range of a battery, for example, can be improved.

Figure 4:
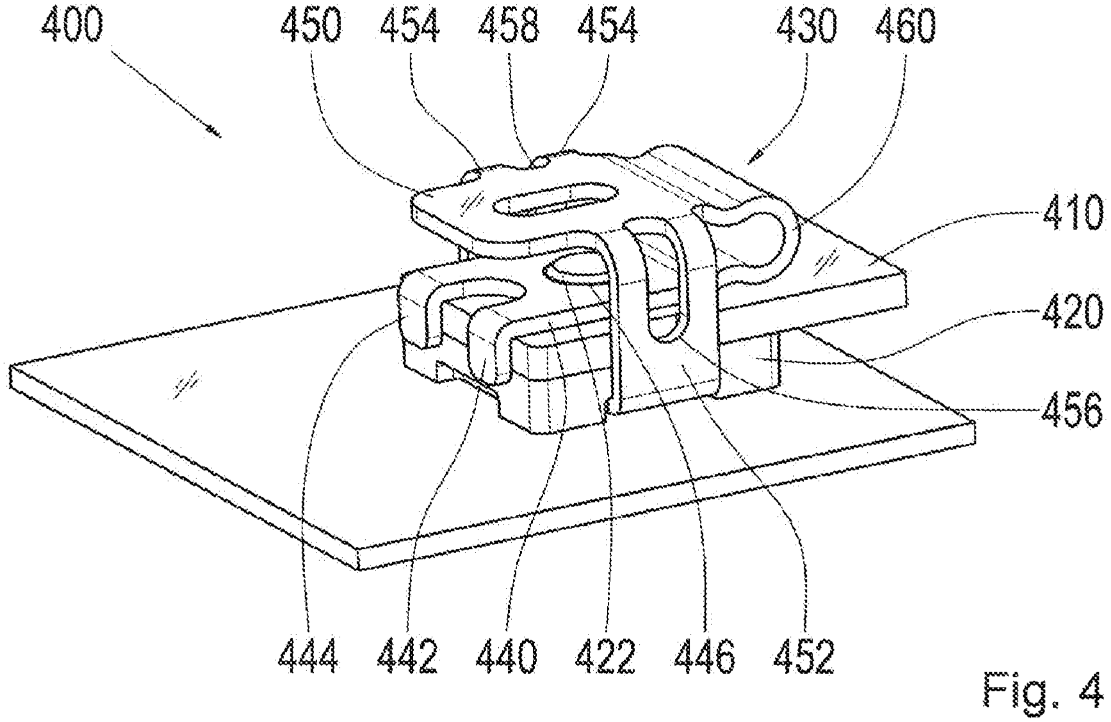
FIG. 4 shows a perspective view of a connecting system according to an exemplary embodiment of the present invention.

FIG. 4 shows a perspective view of a connecting system 400 according to an exemplary embodiment of the present invention. The connecting system 400 is configured to produce an electrical and mechanical connection between contact partners 410 and 420. The connecting system 400 has a first contact partner 410 and a second contact partner 420 and a spring clip 430. According to the exemplary embodiment of the present invention shown in FIG. 4, the first contact partner is configured as a bus bar, wherein the second contact partner 420 is in the form of a socket.

The first contact partner 410 and the second contact partner 420 are connected electrically to one another in a form fitting manner. The first contact partner 410 and the second contact partner 420 are mechanically secured to one another by means of the spring clip 430. The first contact partner 410 is located therein between the second contact partner 420 and the spring clip 430. The connecting system 400 is located on the support element.

The spring clip 430 is configured to mechanically secure the first contact partner 410 and the second contact partner to one another. The spring clip 430 has a socket section 440, a snap-fit section 450 and a bending section 460. These are spaced apart. The bending section 460 is located between the socket section 440 and the snap-fit section 450. The bending section 460 basically connects the socket section 440 and the snap-fit section 450. The bending section 460 is C-shaped, by way of example. The socket section 440 and the snap-fit section 450 are each flat, by way of example. If necessary, they can have a different topology, e.g. curved.

The bending section 460 of the spring clip 430 can be bent between a relaxed state and a tensioned state. The spring clip 430 is shaped thereby such that the bending section 460 has a V-shaped cross section when in the relaxed state, and a U-shaped cross section when tensioned. FIG. 4 shows the bending section 460 in the tensioned state, wherein the spring clip 430 has a U-shaped cross section. The U-shaped cross section can be seen in particular in FIG. 6. The socket section 440 and the snap-fit section 450 are clearly parallel to one another in this tensioned state. The C-shape of the bending section 460 can likewise be readily seen in FIG. 6. By way of comparison, the relaxed state of the spring clip 430 can be seen in FIG. 15. In this case, it has a V-shaped cross section. The socket section 440 and the snap-fit section 450 are at an angle (greater than 0°) to one another in this state.

The socket section 440 of the spring clip 430 has only two guide lugs 442 and 444, by way of example, in the exemplary embodiment of the present invention shown in FIG. 4. The guide lugs 442 and 444 are shaped such that they enable, or result in, a form fitting connection of the spring clip 430 to the first contact partner 410. The guide lugs 442 and 444 are located on an end of the socket section 440 facing away from the bending section 460 in the exemplary embodiment of the present invention shown in FIG. 4. The guide lugs 442 and 444 project upward from the socket section 440 on a side of the socket section 440 facing away from the snap-fit section 450. The planes of extension of the guide lugs 442 and 444 are parallel to one another. In other words, the guide lugs 442 and 444 form curved end sections of the socket section 440 on the end of the socket section 440 facing away from the bending section 460.

The snap-fit section 450 of the spring clip 430 has only two snap-fit hooks 452 and 454 according to the exemplary embodiment of the present invention shown in FIG. 4, of which only one first snap-fit hook 452 is explicitly shown, due to the constraints of the illustration. Statements regarding the first snap-fit hook 452 apply accordingly to the second snap-fit hook 454 of the snap fit section 450 that is partially hidden in the illustration. The first snap-fit hook 452 and the second snap-fit hook 454 are located on two opposite sides of the snap-fit section 450. The first snap-fit hook 452 and the second snap-fit hook 454 are configured to snap into the second contact partner 420. Hook sections of the first snap-fit hook 452 and the second snap-fit hook 454 engage in recesses or cavities in the second contact partner 420. The first snap-fit hook 452 and the second snap-fit hook 454 project upward from the snap-fit section 450 on a side of the snap-fit section 450 facing toward the socket section 440. The first snap-fit hook 452 and the second snap-fit hook 454 extend beyond the socket section 440 into a region in the second contact partner 420.

According to the exemplary embodiment of the present invention shown in FIG. 4, the second contact partner 420 has a coupling section 422. Merely by way of example, the coupling section 422 is in the form of a cylindrical projection. The coupling section 422 is inserted through a hole in the first contact partner 410. The socket section 440 of the spring clip 430 has a coupling section 446. This coupling section 446 is a through hole, merely by way of example. The coupling section 422 of the second contact partner 420 and the coupling section 446 of the socket section 440 of the spring clip 430 are connected to one another in a form fitting manner. Furthermore, according to the exemplary embodiment of the present invention shown in FIG. 4, the first snap-fit hook 452 has a first through hole 456 through which an assembly tool is inserted for manipulating the first snap-fit hook 452. The second snap-fit hook 454 has a second through hole 458 through which an assembly tool is inserted in order to manipulate the second snap-fit hook 454. The first through hole 456 and the second through hole 458 are elongated holes therein, merely by way of example.

Figure 5:
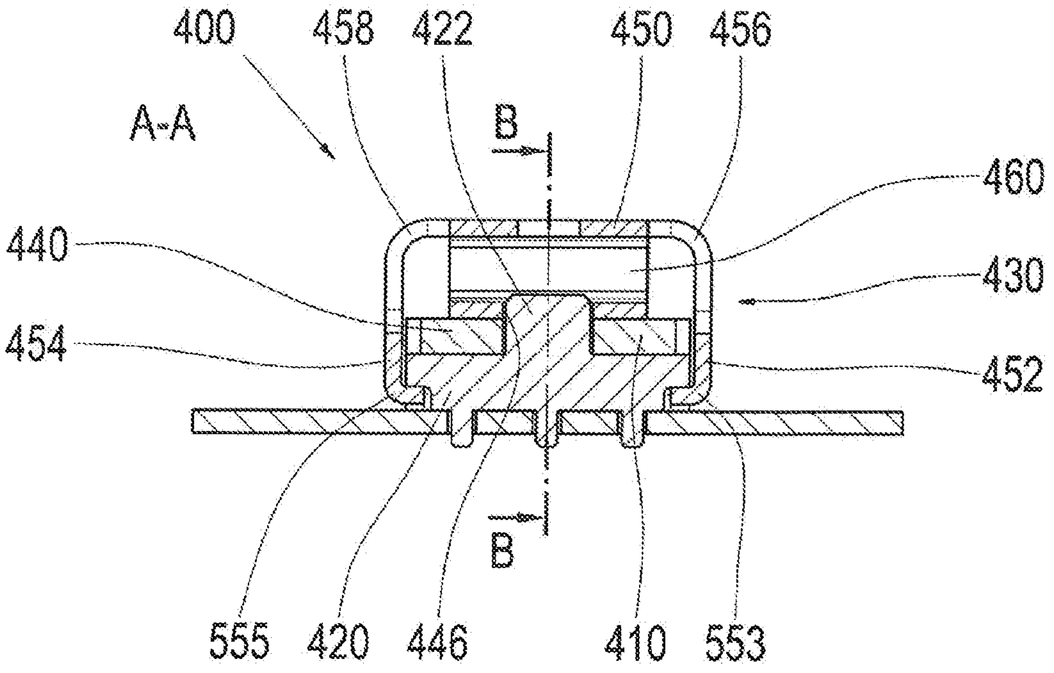
FIG. 5 shows a sectional view of the connecting system in FIG. 4.
Figure 6:
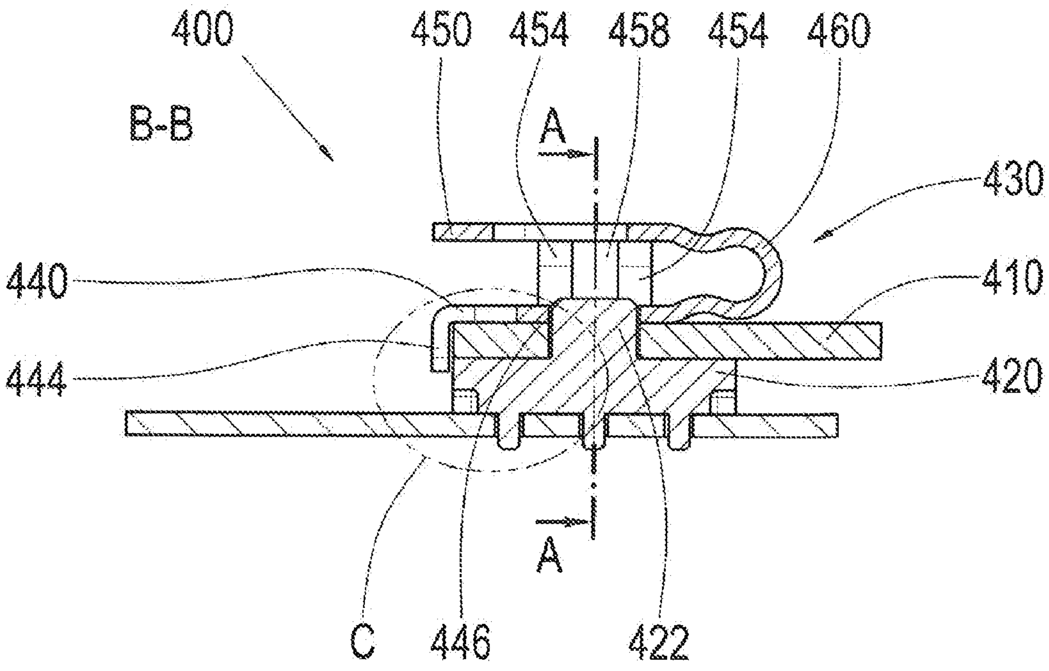
FIG. 6 shows a sectional view of the connecting system from FIGS. 4 and 5.

FIG. 5 shows a sectional view of the connecting system 400 in FIG. 4. The connecting system 400 is shown cut along a cutting plane A-A, which extends along longitudinal axes of the through holes 456 and 458 of the snap-fit hooks 452 and 454 of the spring clip 430. The cutting plane A-A is also shown in FIG. 6. Another cutting plane B-B is also shown in FIG. 5, which extends through the middle of the connecting system 400 and is orthogonal to the cutting plane A-A.

Aside from the guide lugs, all of the elements of the connecting system 400 provided with reference symbols in FIG. 4 are shown in FIG. 5. It can be seen therein that the snap-fit hooks 452 and 454 partially encompass the coupling section 440 of the spring clip 430 in the sectional view in FIG. 5. Furthermore, hook sections 553 and 555 of the snap-fit hooks 452 and 454 that are at bent at least 90° are shown in FIG. 5. The first snap-fit hook 452 has a first hook section 553. The second snap-fit hook 454 has a second hook section 555. The hook sections 553 and 555 engage in respective recesses in the second contact partner 420.

FIG. 6 shows a sectional view of the connecting system 400 in FIG. 4 and FIG. 5. The connecting system 400 is cut in FIG. 6 along the second cutting plane B-B shown in FIG. 5. All of the elements of the connecting system 400 provided with reference symbols in FIG. 4 are shown in FIG. 6, except for a first guide lug and the first snap-fit hook. The cutting plane A-A is also visible in FIG. 6, along which the connecting system 400 shown in FIG. 5 is cut. Furthermore, a detail C is indicated in FIG. 6, which is shown in FIG. 7.

Figure 7:
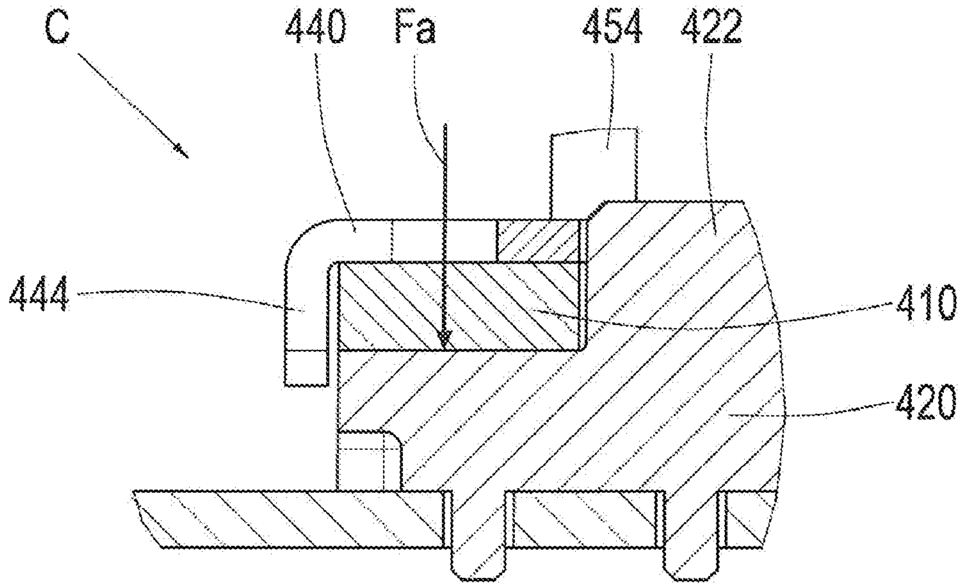
FIG. 7 shows a detail of the connecting system in FIG. 6.

FIG. 7 shows a detail C of the connecting system 400 in FIG. 6. Subsections of the first contact partner 410, the second contact partner 420, the coupling section 422, the socket section 440 and the second snap-fit hook 454, as well as a guide lug 444 of the spring clip of the connecting system 400 are shown in the detail C. The spring clip presses the first contact partner 410, or the bus bar, with a force Fa, or pressure force Fa, or compression force Fa, against the second contact partner 420, or socket.

A spring clip 430 or a spring clip contact 430, in particular for contact bars, or so-called bus bars, is shown in the contact system 400 in FIGS. 4 to 7. As is shown in FIGS. 4 to 7, the contact bar, or bus bar, serving as the first contact partner, is pressed by the spring clip 430 against the socket serving as the second contact partner 420. The second contact partner 420 has a pin, which holds the first contact partner 410 in place, which has an appropriate hole running perpendicular to the joining direction. Furthermore, the second contact partner 420 has at least two pockets or recesses, into which the arms, or snap-fit hooks 452 and 454 of the spring clip 430 can be snapped, such that they become anchored therein. The spring clip 430 thus presses the bus bar against the socket with a force Fa.

Figure 8:
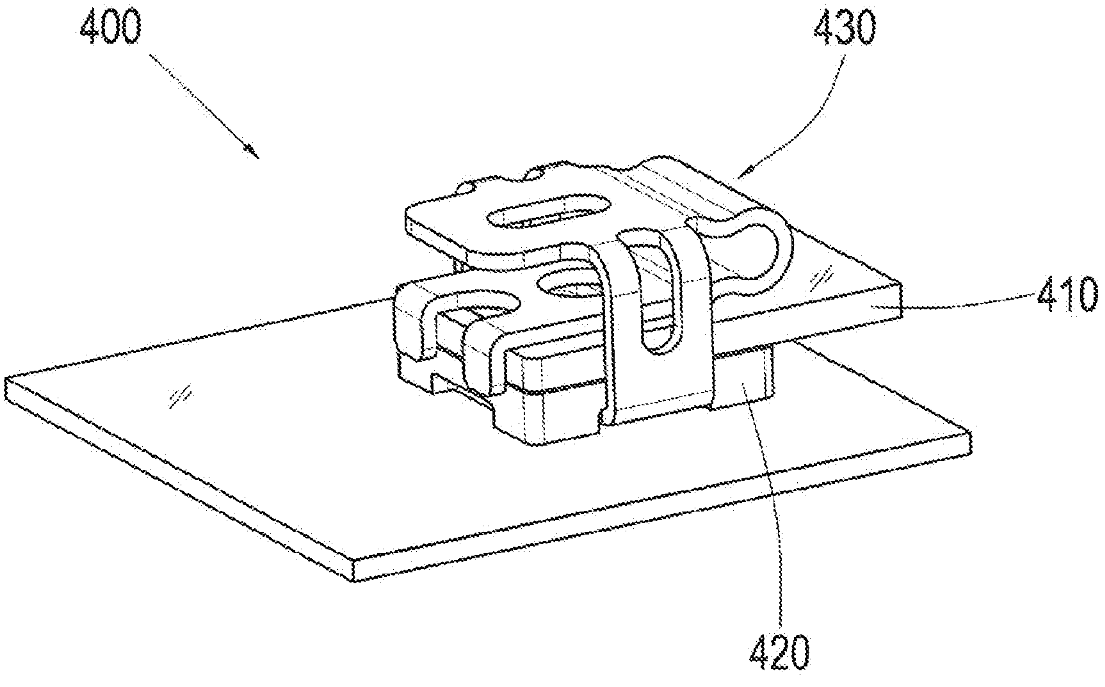
FIG. 8 shows a perspective view of a connecting system according to an exemplary embodiment of the present invention.

FIG. 8 shows a perspective view of a connecting system 400 according to an exemplary embodiment of the present invention. The connecting system 400 shown in FIG. 8 corresponds to the connecting system in FIGS. 4 to 7, with the exception that the first contact partner 410 and the second contact partner 420 have different shapes, as shall be explained below in greater detail in reference to FIGS. 9 to 11.

Figure 9:
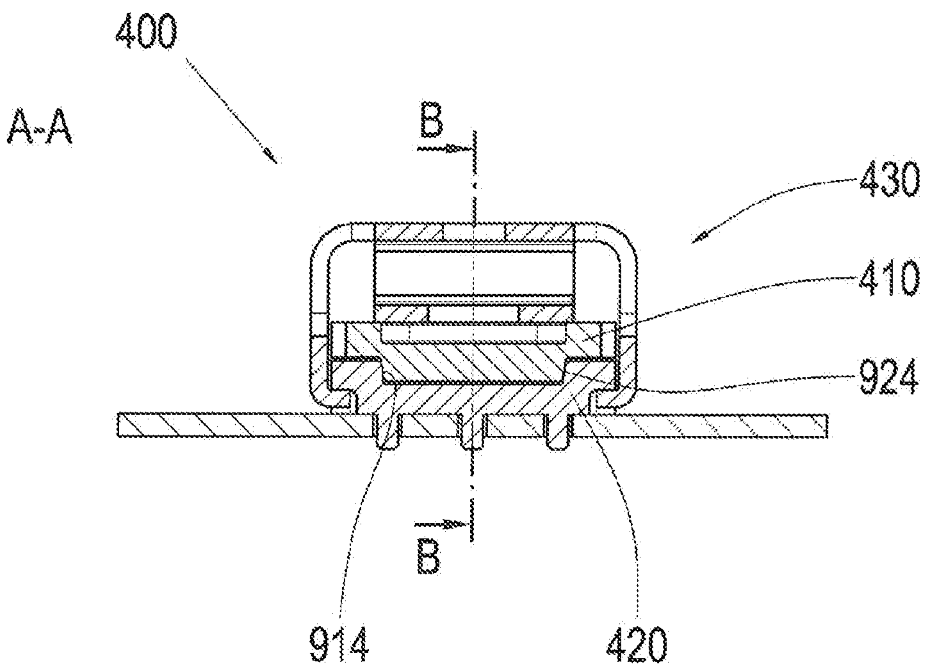
FIG. 9 shows a sectional view of the connecting system in FIG. 8.
Figure 10:
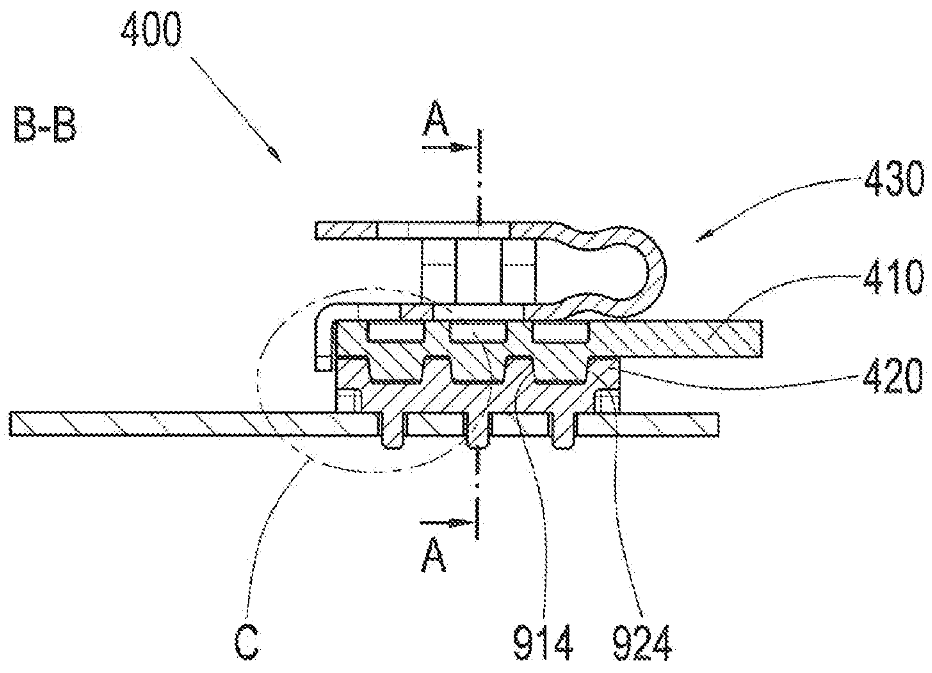
FIG. 10 shows a sectional view of the connecting system in FIGS. 8 and 9.

FIG. 9 shows a sectional view of the connecting system 400 in FIG. 8. The connecting system 400 is shown therein cut along a cutting plane A-A, which extends along the longitudinal axes of the through holes formed as elongated holes in the snap-fit hooks of the spring clip in the connecting system 400 in FIG. 8. The cutting plane A-A is also shown in FIG. 10. Another cutting plane B-B is also shown in FIG. 9, which extends through the middle of the connecting system 400 and is orthogonal to the cutting plane A-A.

A first connecting section 914 of the first contact partner 410 and a second connecting section 924 of the second contact partner 420 are shown in FIG. 9. The first connecting section 914 and the second connecting section 924 are complementary to one another, and connected in a form fitting manner to one another in FIG. 9. The first contact partner 410 and the second contact partner 420 are connected to one another in a form fitting manner by means of the first connecting section 914 and the second connecting section 924. The first connecting section 914 is in the shape of a projection, merely by way of example, wherein the second connecting section 924 is in the shape of a recess. In particular, the flanks of the first connecting section 914 and the second connecting section 924 are slanted, or diagonal.

Figure 11:
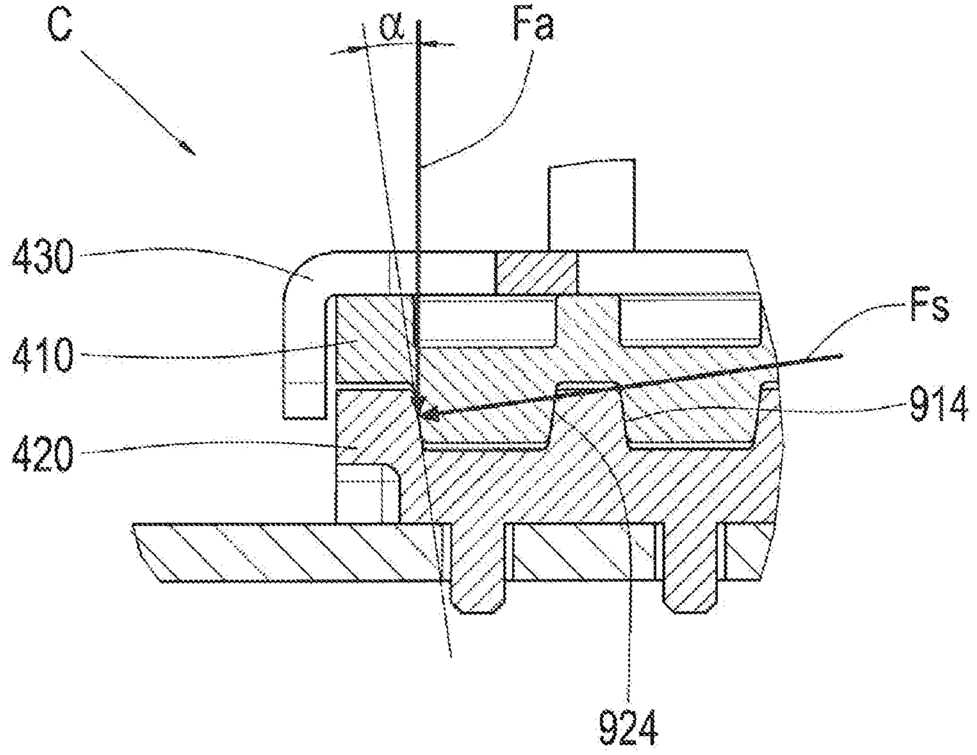
FIG. 11 shows a detail of the connecting system in FIG. 10.

FIG. 10 shows a sectional view of the connecting systems in FIG. 8 and FIG. 9 respectively. FIG. 10 shows the connecting system 400 cut along the further cutting plane B-B shown in FIG. 9. The cutting plane A-A is also shown in FIG. 10, along which the cutting system 400 is cut in FIG. 9. Furthermore, a detail C is indicated in FIG. 10, which is shown in FIG. 11. It can be seen in the sectional view in FIG. 10 that the first contact partner has three first connecting sections 914 according to the exemplary embodiment of the present invention shown herein, wherein the second contact partner 420 has three second connecting sections 924, by way of example. The diagonal or slanted flanks of the connecting sections 914 and 924 can be seen in FIG. 10.

FIG. 11 shows a detail C of the connecting system in FIG. 10. Subsections of the first contact partner 410, the second contact partner 420 and the spring clip 430 of the connecting system 400 are shown in the detail C. Furthermore, a pressure force Fa, as a standard force, a lip angle $\alpha$, and a contact force Fs are indicated with respect to the connecting sections 914 and 924. The lip angle $\alpha$ also indicates a slant of the flanks of the connection sections 914 and 924 in relation to a plane of extension for the contact partners 410 and 420.

It should be noted that, with respect to FIGS. 8 to 11, the spring clip 430 is configured as a wedge-spring clip contact for bus bars or current bars. As is shown in particular in FIGS. 9 to 11, a contact surface is formed in the connecting system 400 shown in FIGS. 8 to 11, between the current bar and the socket, or between the first contact partner 140 and the second contact partner 420 in the form of a wedge. In this case, a form fitting connection exists in a plane perpendicular to the joining direction, which prevents a displacement of the contact surfaces, and thus friction applied to a protective coating when vibrations arise. Furthermore, the contact force Fs, i.e. the standard force acting on the contact surfaces, which is increased via the wedge, or diagonal flanks by a reinforcement factor V with respect to the pressure force Fa or spring force, wherein the reinforcement factor V is a function of the lip angle $\alpha$ and the frictional value $\mu$. Thus: $Fs=V(\alpha,\mu)*Fa$.

Figure 12:
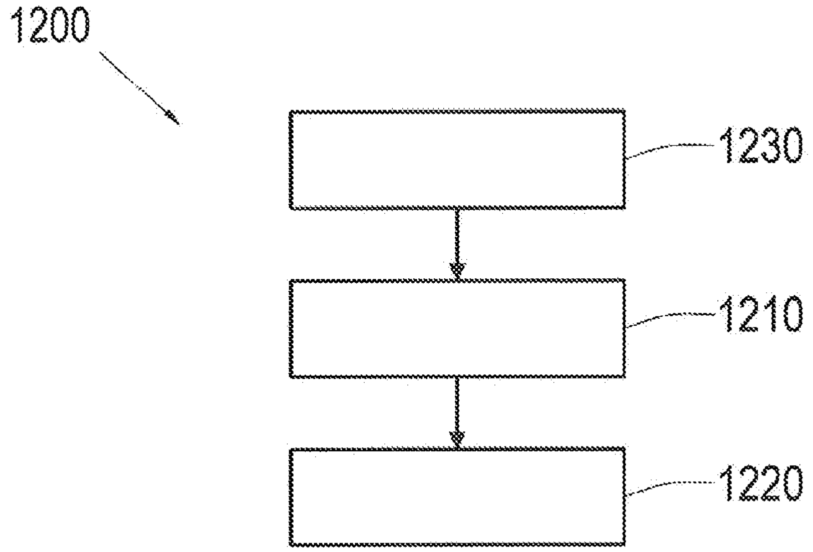
FIG. 12 shows a flow chart for a method for securing according to an exemplary embodiment of the present invention.

FIG. 12 shows a flow chart for a method 1200 for securing according to an exemplary embodiment of the present invention. The method 1200 for securing can be executed to secured contact partners from any of the figures described above and/or below, or similar contact partners, to one another. The method 1200 for securing can be executed thereby using spring clips from any of the figures described above and/or below, or similar spring clips.

In general, the method 1200 can be executed in conjunction with a spring clip that has a socket section with at least one guide lug for a form fitting connection to a first contact partner, a snap-fit section with at least one snap-fit hook for snapping into a second contact partner, and a bending section between the socket section and the snap-fit section. The bending section is configured such that it can be bent between a relaxed state and a tensioned state. The spring clip is configured such that it has a V-shaped cross section in the relaxed state and a U-shaped cross section in the tensioned state.

The method 1200 for securing has a step 1210 for placing the spring clip on the first contact partner with the socket section, which is connected to the second contact partner electrically and in a form fitting manner, in order to produce a form fitting connection between the at least one guide lug of the socket section of the spring clip and the first contact partner. Subsequently, in a step 1220 of the method 1200 for securing, the at least one snap-fit hook of the snap-fit section of the spring clip is deflected, in order to snap the at least one snap-fit hook into the second contact partner. This results in the bending section of the spring clip becoming tensioned.

According to one exemplary embodiment, the method 1200 for securing also has a step 1230 for tensioning the bending section of the spring clip. The tensioning step 1230 can be executed thereby before the deflection step 1220 and/or before the placement step 1210.

FIGS. 13 to 18 show perspective views of an assembly or assembly principle for a connecting system 400 according to an exemplary embodiment of the present invention, in particular a printed circuit board contact, by way of example. The assembly of the connecting system 400 shown in FIGS. 13 to 18 relates to the connecting system in FIGS. 4 to 7.

Figure 13:
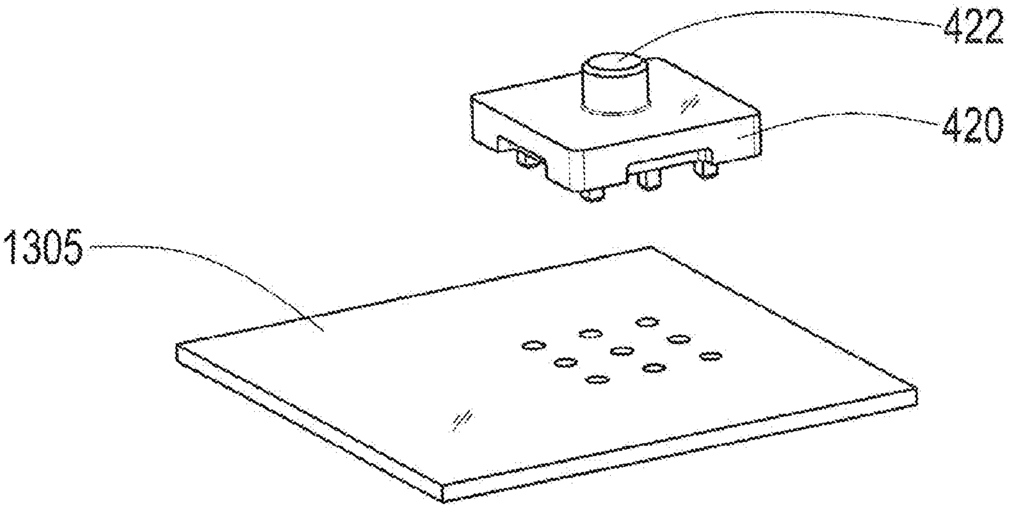
FIGS. 13 to 18 show perspective views of the assembly of a connecting system according to an exemplary embodiment of the present invention.

FIG. 13 shows a perspective view of a first assembly step for the connecting system in FIGS. 4 to 7. The second contact partner 420, or the socket, is connected therein to a printed circuit board 1305. The second contact partner 420 has the coupling section 422.

Figure 14:
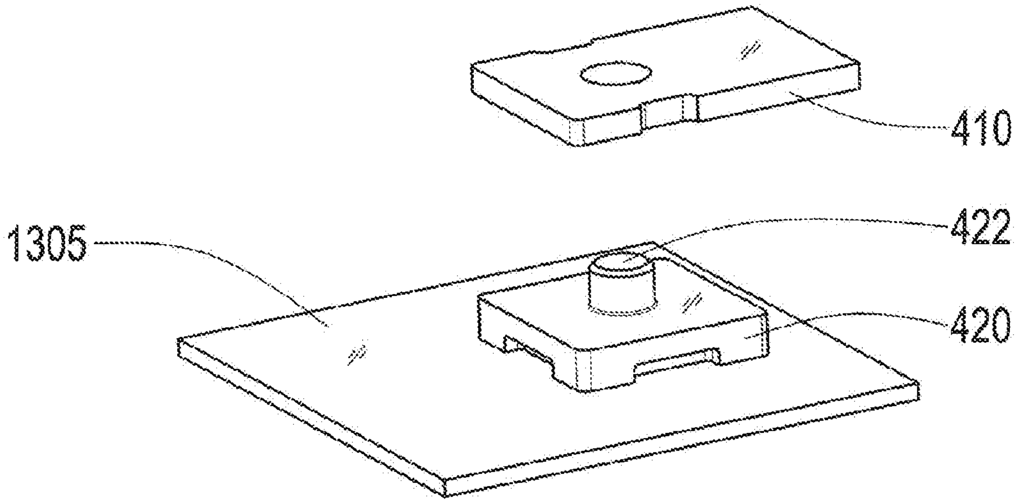

FIG. 14 shows a perspective view of a second assembly step for the connecting system in FIGS. 4 to 7 following the first assembly step in FIG. 13. The first contact partner 410, or bus bar, is placed on the second contact partner 420, or the socket, therein.

Figure 15:
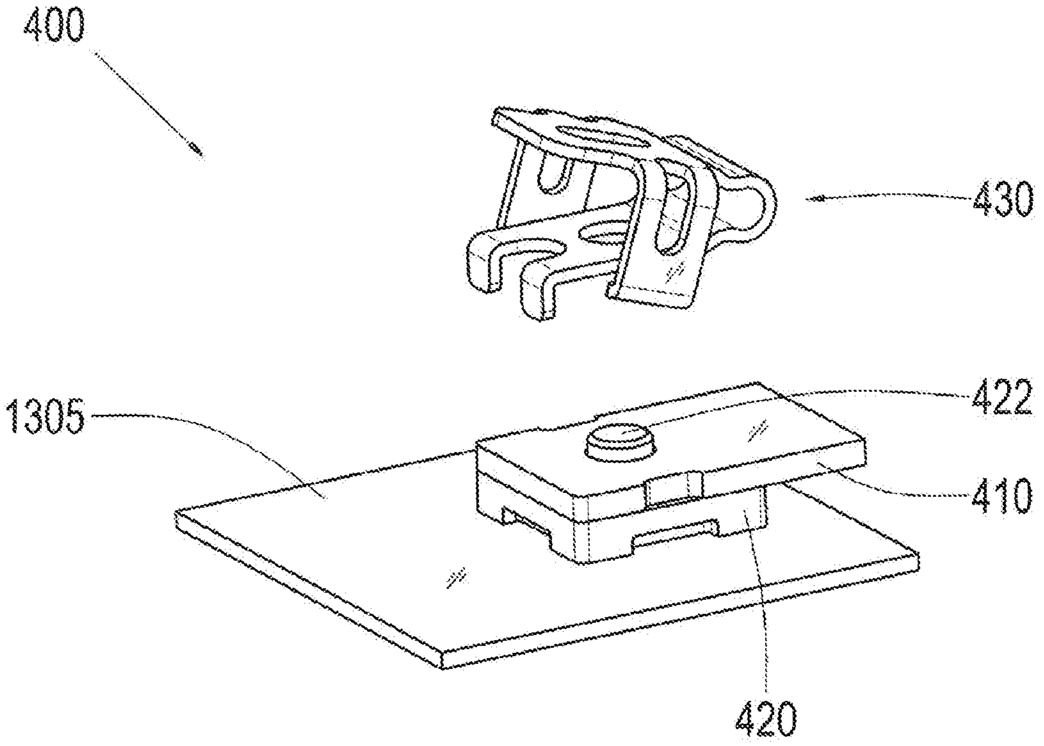

FIG. 15 shows a perspective view of a third assembly step for the connecting system 400 in FIGS. 4 to 7, following the assembly step in FIG. 14. The spring clip 430 is placed thereon in this step. More precisely, the spring clip 430 is placed on the first contact partner 410 and the second contact partner 420, which are electrically connected to one another in a form fitting manner, wherein the coupling section 422 of the second contact partner 420 extends through a through hole in the first contact partner 410.

Figure 16:
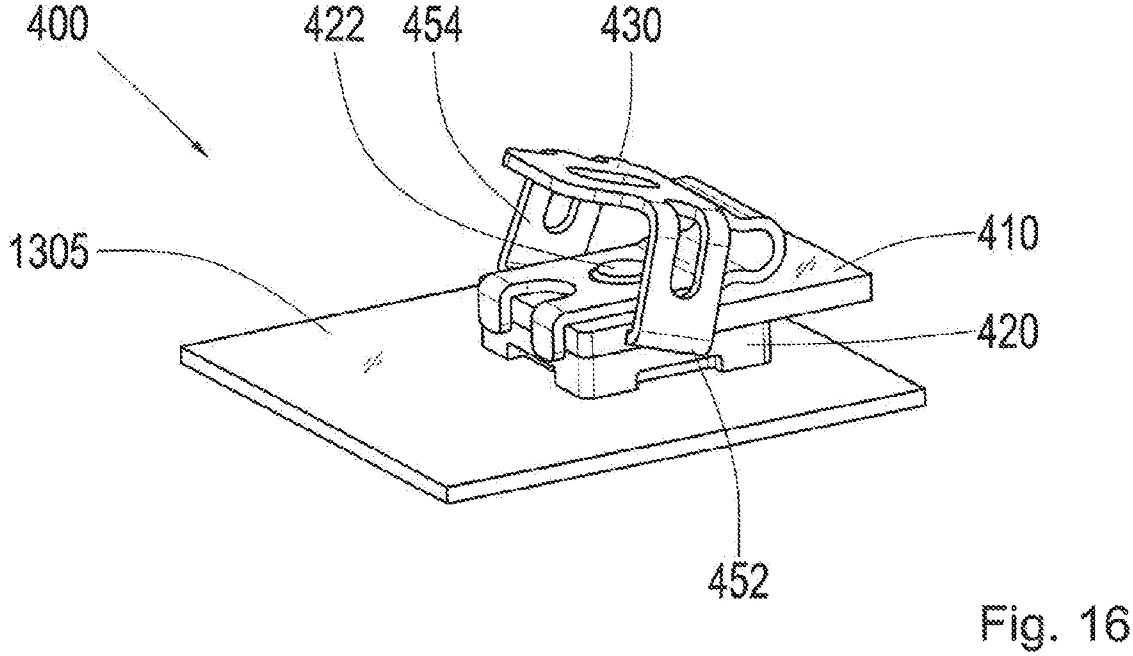

FIG. 16 shows a perspective view of a fourth assembly step for the connecting system 400 in FIGS. 4 to 7, following the assembly step in FIG. 15. The spring arms, or snap-fit hooks 452 and 545 of the spring clip 430 are spread apart. The spring clip 430 is connected in a form fitting manner at its socket section to the first contact partner 410, and is also connected in a form fitting manner to the coupling section 422 of the second contact partner 420.

Figure 17:
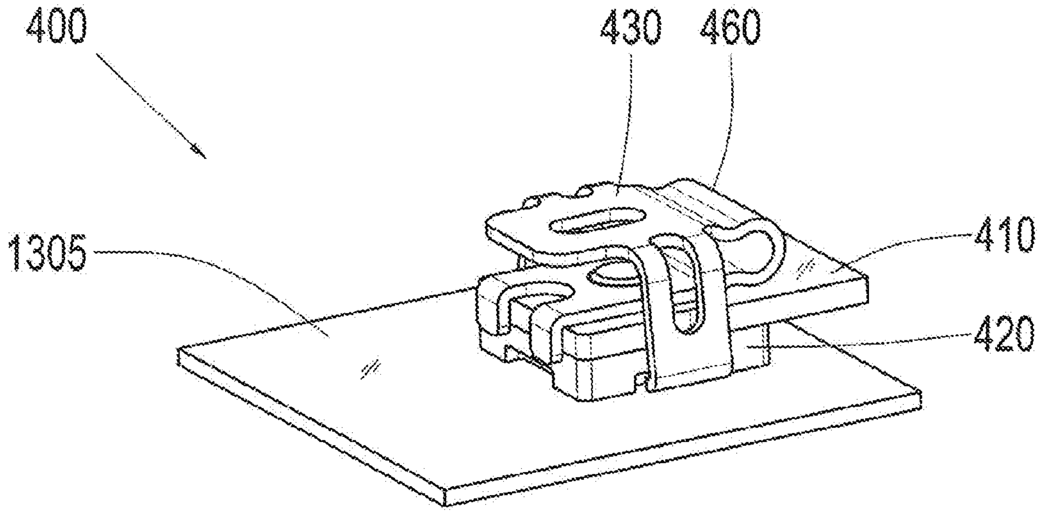

FIG. 17 shows a perspective view of a fifth assembly step for the connecting system 400 in FIGS. 4 to 7, following the fourth assembly step in FIG. 16. The spring clip 430 is pressed downward, or tensioned, therein. In other words, the bending section 460 of the spring clip 430 is tensioned, such that the spring clip 430 assumes the U-shaped cross section.

Figure 18:
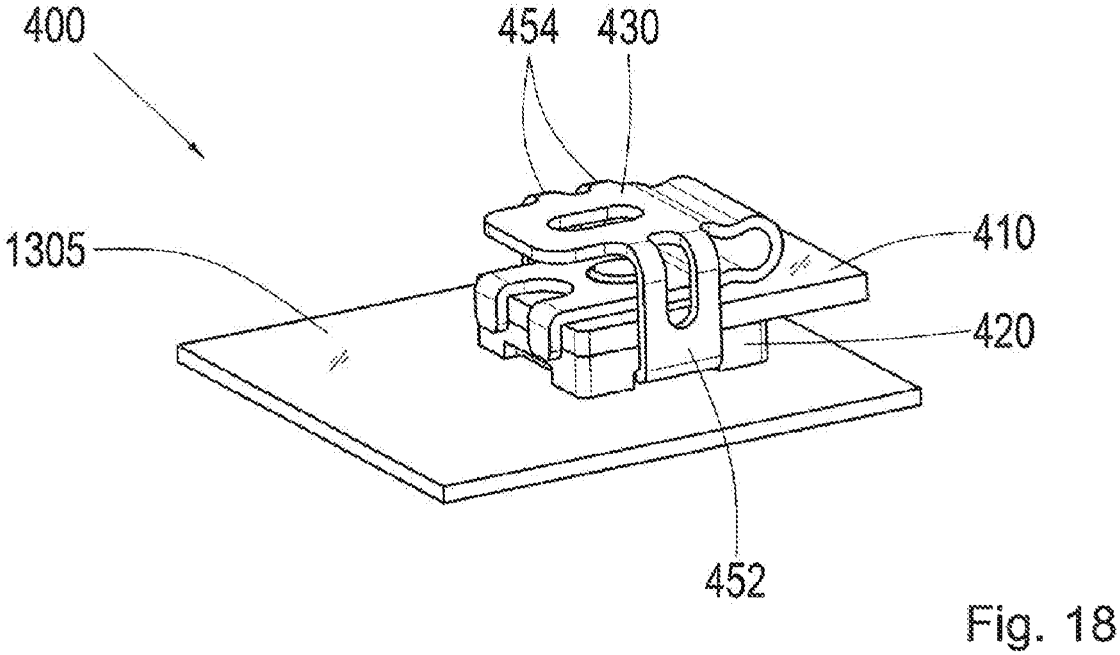

FIG. 18 shows a perspective view of a sixth assembly step for the connecting system 400 in FIGS. 4 to 7, following the fifth assembly step in FIG. 17. The spring arms or snap-fit hooks 452 and 454 of the spring clip 430 are released, or relaxed, therein, and anchored to, or snapped into, the second contact partner, or socket.

Figure 19:
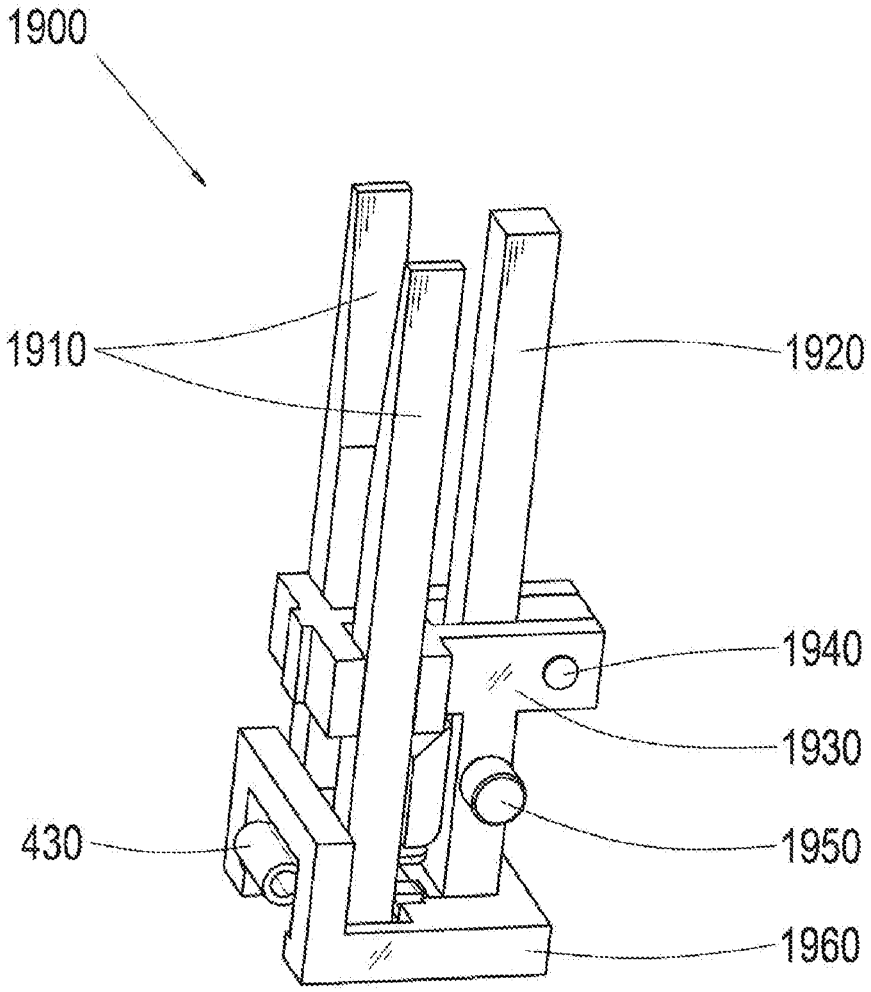
FIG. 19 shows a perspective view of an assembly tool with a spring clip according to an exemplary embodiment of the present invention.

FIG. 19 shows a perspective view of an assembly tool 1900 with a spring clip 430 according to an exemplary embodiment of the present invention. The assembly tool 1900, or the tool 1900, respectively, is configured to enable a gentle and nearly effortless assembly of the spring clip 430. The spring clip 430 is the spring clip in any of the figures described above and/or below, or a similar spring clip. The assembly tool 1900 can be used or applied in conjunction with the method for securing in FIG. 12. The spring clip 430 is shown in the assembly tool 1900 in FIG. 19.

The assembly tool is thus configured to electrically secure connectable contact partners to one another in a form fitting manner by means of the spring clip 430. The assembly tool 1900 has a pair of first levers 1910, a second lever 1920, a mount 1930, a bearing pin 1940, a securing pin 1950, and a guide shoe 1960 according to the exemplary embodiment of the present invention shown in FIG. 19. The first levers 1910 are configured to deflect the snap-fit hooks of the snap-fit section of the spring clip 430. The second lever 1920 is configured to tension the bending section of the spring clip 430. The first levers 1910 and the second lever 1920 are located on the mount 1930.

Figure 20:
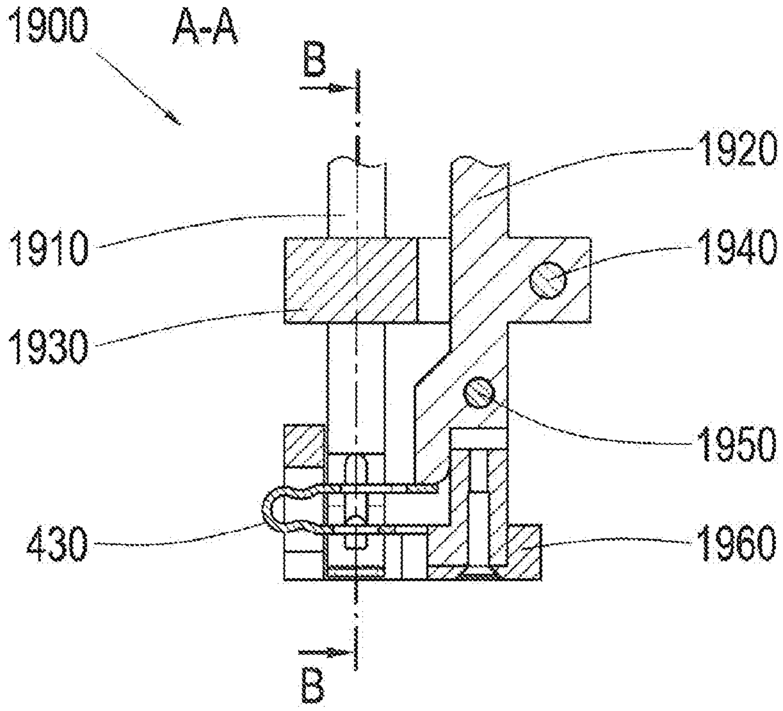
FIGS. 20 and 21 show sectional views of the assembly tool and the spring clip in FIG. 19.
Figure 21:
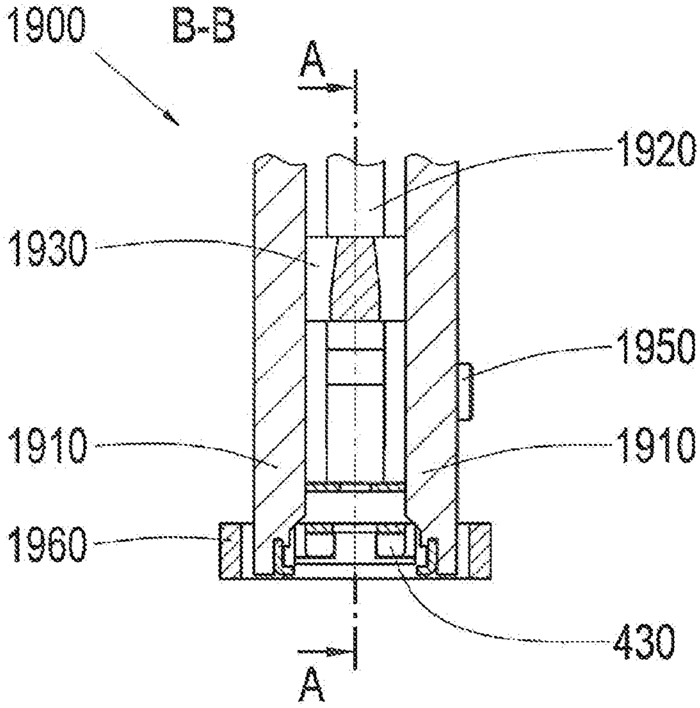

FIG. 20 shows a sectional view of the assembly tool 1900 and the spring clip 430 in FIG. 19. The assembly tool 1900 is shown therein, cut along a cutting plane A-A, which extends through the second lever 1920 and between the first levers 1910, as well as through the spring clip 430. The cutting plane A-A is also shown in FIG. 21. Another cutting plane B-B is also shown in FIG. 20, which extends through the first levers 1910 as well as the spring clip 430, and is orthogonal to the cutting plane A-A.

FIG. 21 shows a sectional view of the assembly tool 1900 and the spring clip 430 in FIGS. 19 and 20. FIG. 21 shows the assembly tool 1900 and the spring clip 430 cut along the second cutting plane B-B shown in FIG. 20. The cutting plane A-A is also shown in FIG. 21, along which the assembly tool 1900 and the spring clip 430 shown in FIG. 20 are cut.

FIGS. 22 to 28 show perspective views relating to the course of a securing procedure, or installation of a spring clip 430 for a connecting system 400 by means of an assembly tool according to an exemplary embodiment of the present invention. In other words, the course of a spring clip installation with the tool, or assembly tool, is shown in FIGS. 22 to 28.

The assembly tool 1900 is the assembly tool shown in FIGS. 19 to 21, or a similar assembly tool. The spring clip 430 is the spring clip in any of the figures described above and/or below, or a similar spring clip. The connecting system 400 corresponds in particular to the connecting system in FIGS. 8 to 11. The securing procedure, or installation of the spring clip 430 is thus associated to the method for securing in FIG. 12 and, optionally, the installation shown in FIGS. 13 to 18.

Figure 22:
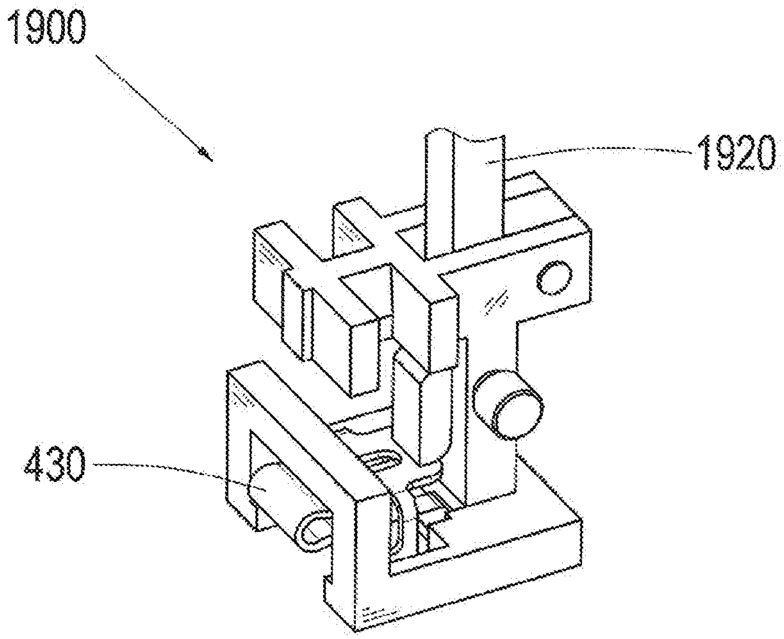
FIGS. 22 to 28 show perspective views of the course of a securing procedure, or an assembly of a spring clip for a connecting system by means of an assembly tool according to an exemplary embodiment of the present invention.

FIG. 22 shows a first step in the spring clip installation, wherein the spring clip 430 is tensioned by the second lever 1920 of the assembly tool 1900. In other words, the spring clip 430 is tensioned in the assembly tool 1900 with the second lever 1920.

Figure 23:
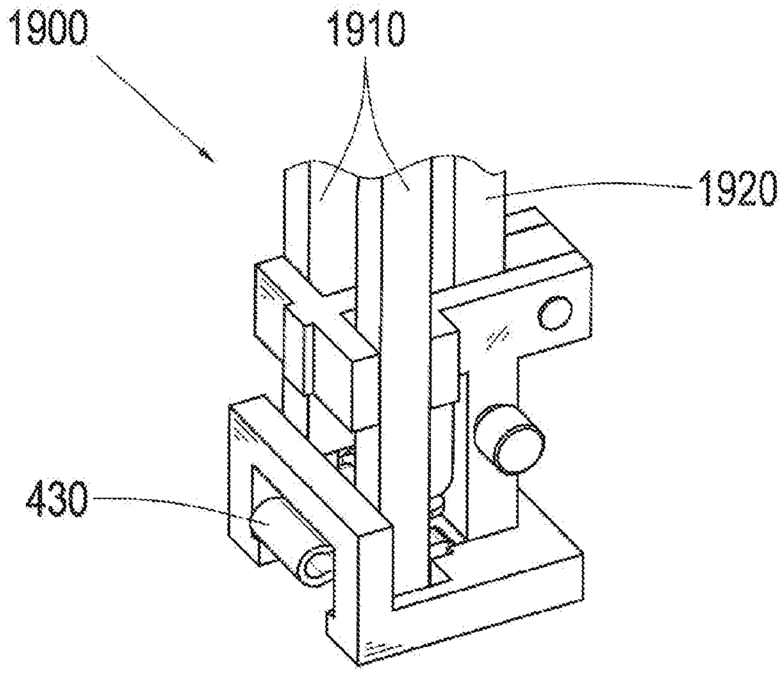

FIG. 23 shows a second step in the spring clip installation, following the step in FIG. 23. The snap-fit hooks, or spring arms of the spring clip 430 are deflected, or spread apart, by means of the first levers 1910 in this step. The contact partners 410 and 420 in FIGS. 8 to 11 that are connected to one another in a form fitting manner are also shown in FIG. 24.

Figure 24:
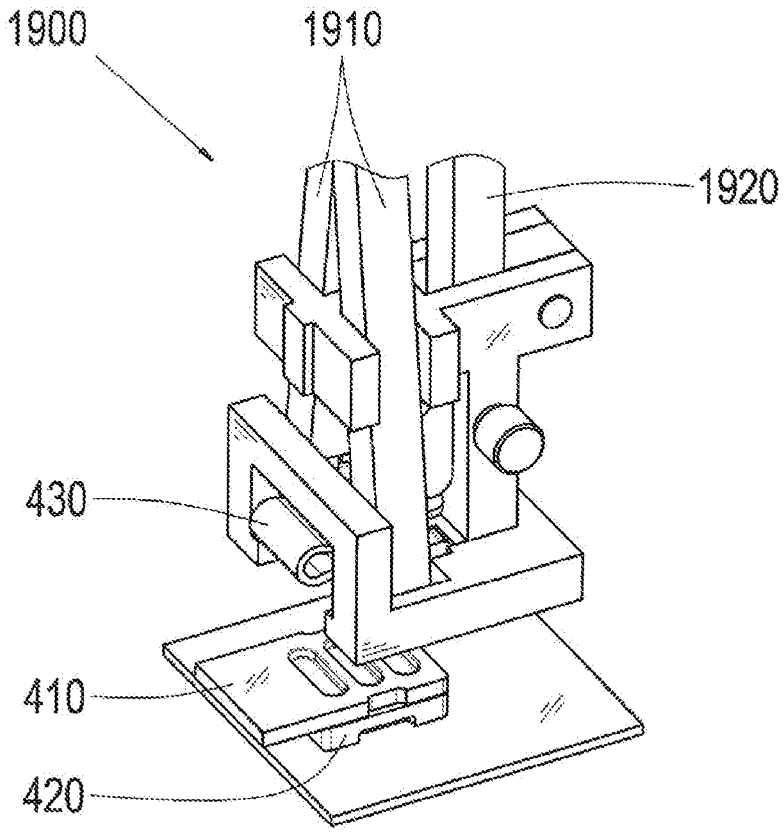
Figure 25:
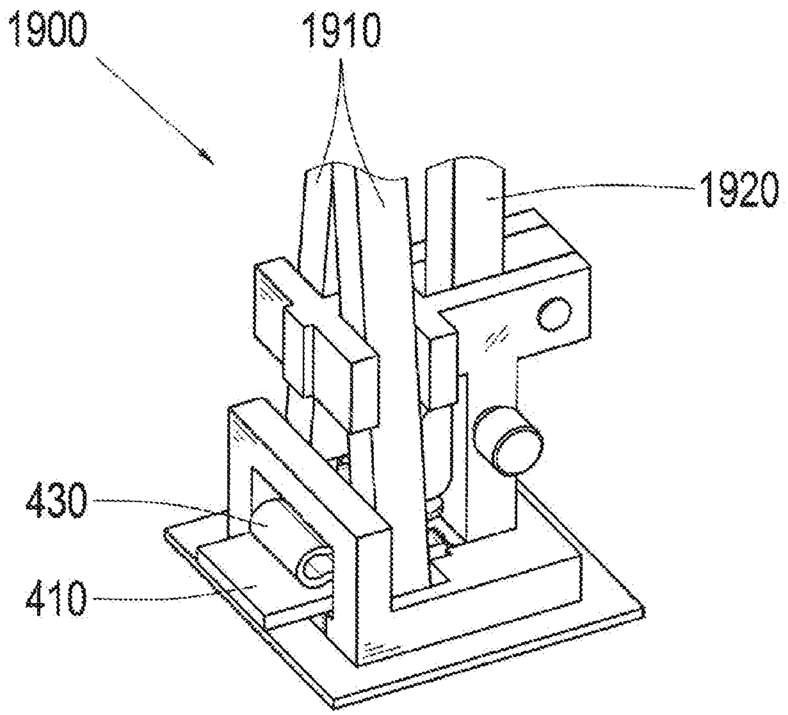

FIG. 25 shows a fourth step in the spring clip installation, following the third step in FIG. 24. The assembly tool 1900 is placed with the spring clip 430 on the contact partners 410 and 420 therein.

Figure 26:
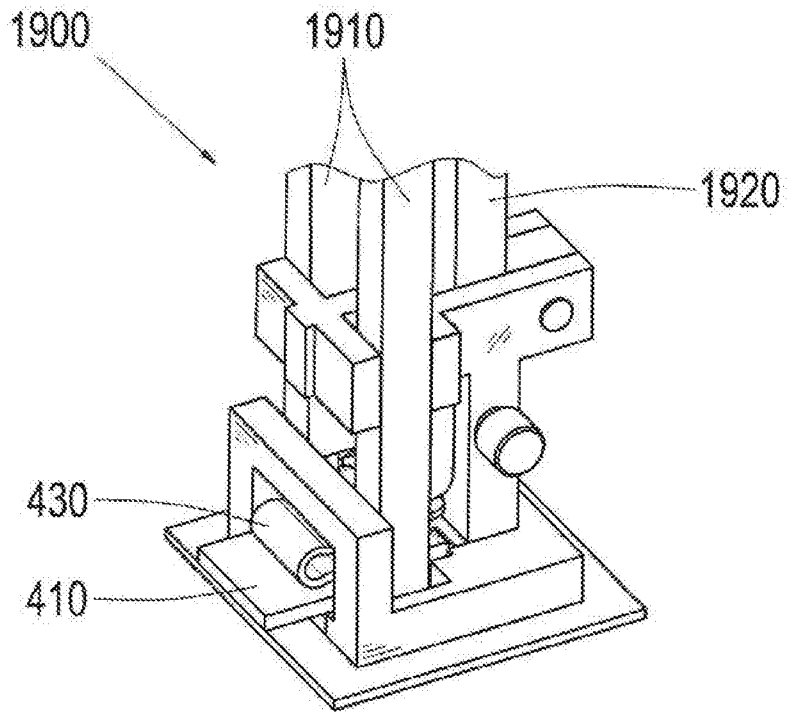

FIG. 26 shows a fifth step in the spring clip installation, following the fourth step in FIG. 25. The snap-fit hooks, or spring arms, of the spring clip 430 are relaxed, or released, through the return movement of the first levers 1910, and thus anchored, or snapped into the socket, or second contact partner.

Figure 27:
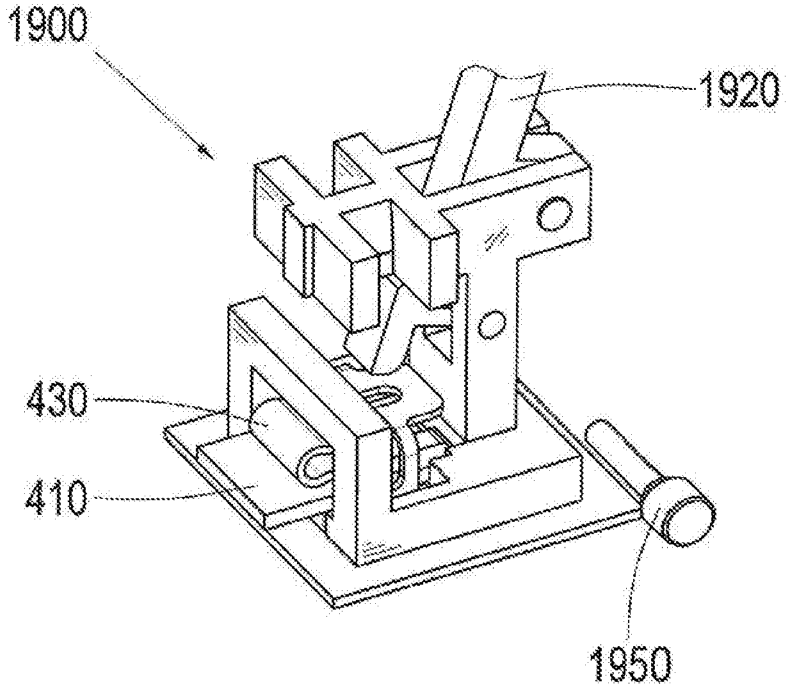

FIG. 27 shows a sixth step in the spring clip installation, following the fifth step in FIG. 26. The first levers for spreading the spring arms, or the lateral pins in the assembly tool 1900 are removed therein, and the second lever 1920 is released therein. The securing pin 1950 is removed thereby.

Figure 28:
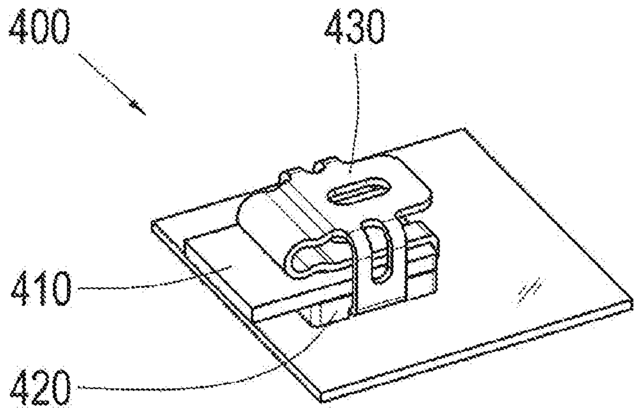

FIG. 28 shows the connecting system 400 after the spring clip installation. In other words, FIG. 28 shows the connecting system 400 at the end of the course of the installation of the spring clip 430 shown in FIGS. 22 to 28. The assembly tool is removed thereby, and the contact point is thus connected, or a mechanical and electrical connection is produced between the contact partners 410 and 420.

Figure 29:
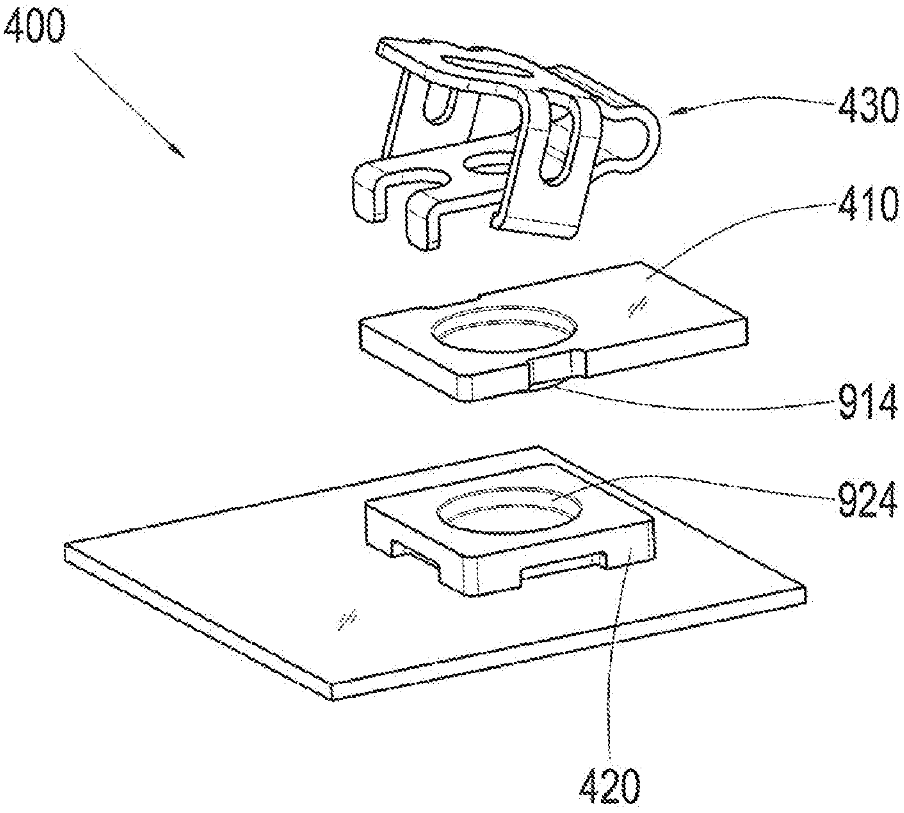
FIGS. 29 to 33 show perspective views of connecting systems according to exemplary embodiments of the present invention.

FIG. 29 shows a perspective view of a connecting system 400 according to any of the exemplary embodiments of the present invention. The connecting system 400 is similar to the connecting system in any of the figures described above. The first contact partner 410, the second contact partner 420, and the spring clip 430 are shown in an exploded view. The first contact partner 410 has a first connecting section 914 and the second contact partner 420 has a second connecting section 924, according to the exemplary embodiment of the present invention shown in FIG. 29. The first connecting section 914 is a projection in the form of a truncated cone, and the second connecting section 924 is a recess in the form of a truncated cone.

Figure 30:
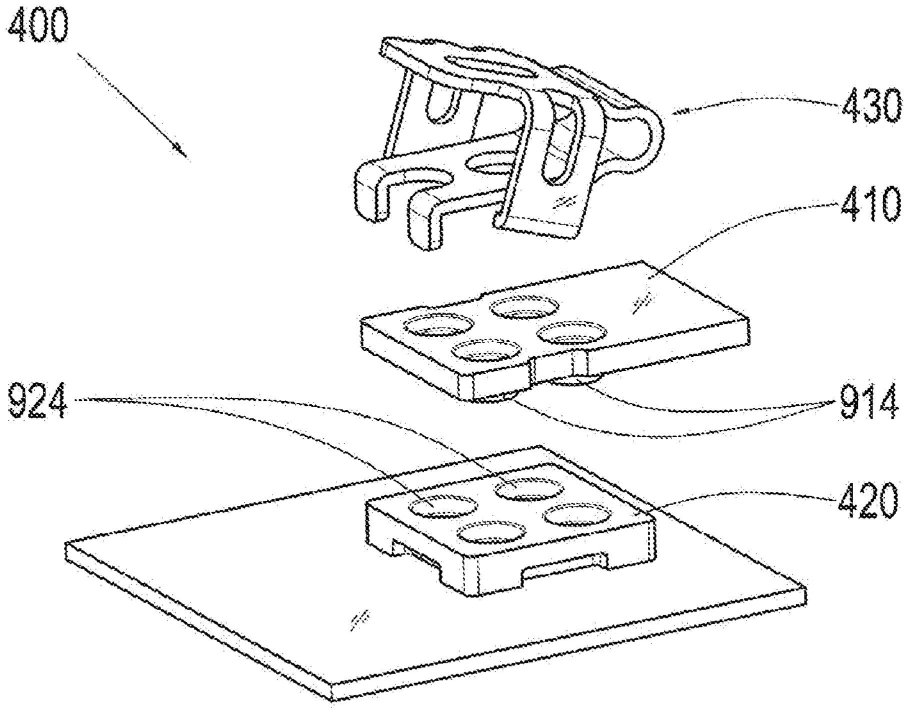

FIG. 30 shows a perspective view of a connecting system 400 according to an exemplary embodiment of the present invention. The connecting system 400 corresponds to the connecting system in FIG. 29 therein, with the exception that there are, by way of example, four first connecting sections 914 in the form of truncated cones, and four second connecting sections 924 in the form of truncated cones.

Figure 31:
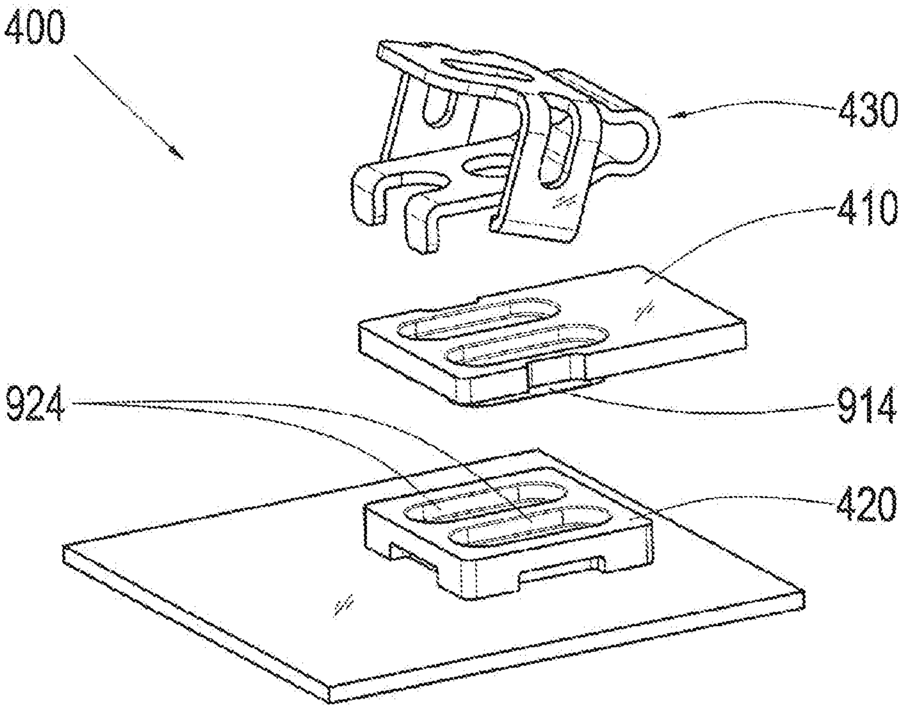

FIG. 31 shows a perspective view of a connecting system 400 according to an exemplary embodiment of the present invention. The connecting system 400 therein corresponds to the connecting system in FIGS. 29 and 30, with the exception that, by way of example, there are two first connecting sections 914 in the form of elongated truncated cones, and two second connecting sections 924 in the form of elongated truncated cones.

Figure 32:
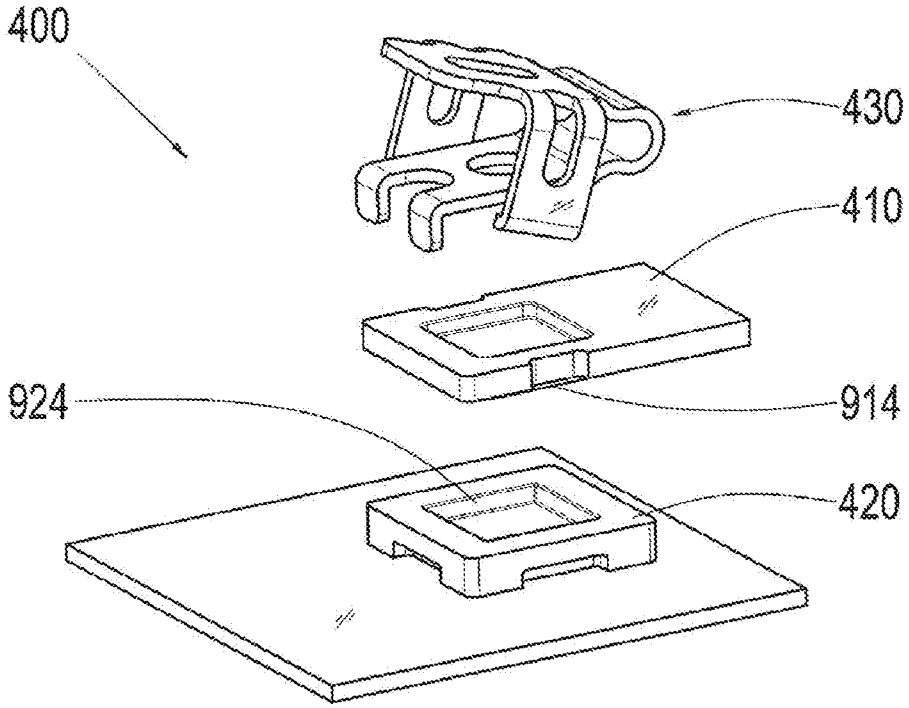

FIG. 32 shows a perspective view of a connecting system 400 according to an exemplary embodiment of the present invention. The connecting system 400 therein corresponds to the connecting system in FIGS. 29, 30, and 31, with the exception that, by way of example, a first connecting section 914 is in the form of a truncated pyramid, and the second connecting section 924 is in the form of a truncated pyramid.

Figure 33:
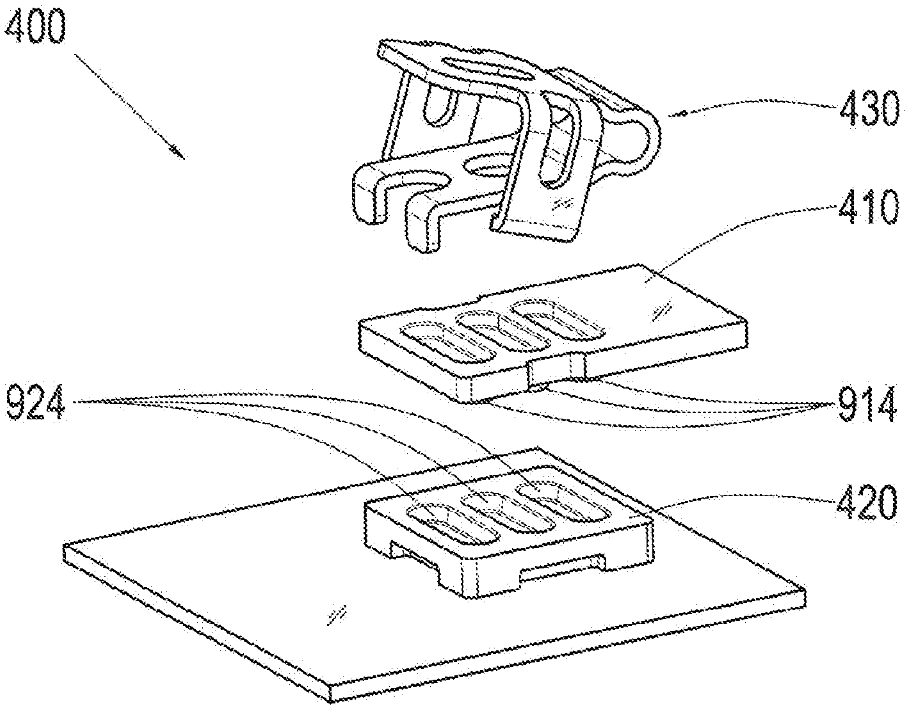

FIG. 33 shows a perspective view of a connecting system 400 according to an exemplary embodiment of the present invention. The connecting system 400 therein corresponds to the connecting system in FIGS. 29, 30, 31 and 32, with the exception that, by way of example, three first connecting sections 914 are in the form of transverse elongated truncated cones, and three second connecting sections 924 are in the form of transverse elongated truncated cones. The connecting system 400 in FIG. 33 corresponds thereby to the connecting system shown in FIGS. 8 to 11.

FIGS. 29 to 33 thus show different designs of a wedge-spring clip contact in the connecting system 400. With the first contact partner 410, or the bus bar, the wedge or cone geometry can be produced, e.g., through cold shaping in the form of an impression, and the second contact partner 420, or the socket, is formed by a stamping process.

Figure 34:
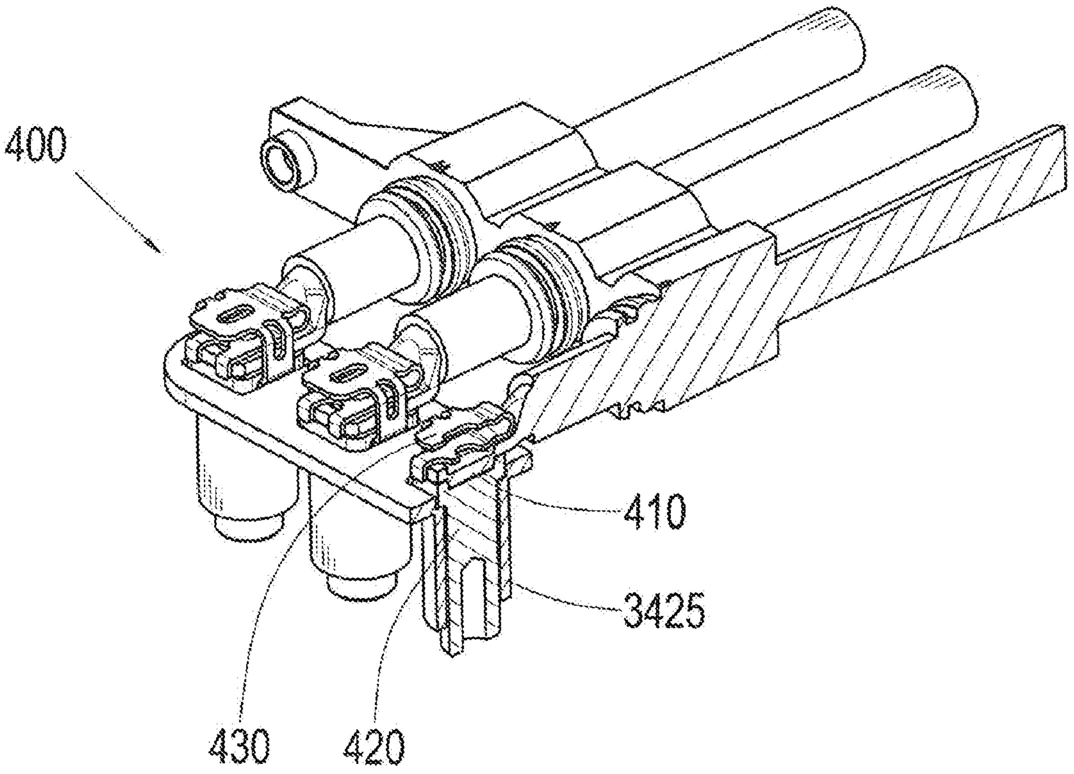
FIG. 34 shows an illustration of a connecting system according to an exemplary embodiment of the present invention.

FIG. 34 shows an illustration of a connecting system 400 according to an exemplary embodiment of the present invention. The connecting system 400 is the connecting system in any of the figures described above, wherein a larger subsection of the contact partners 410 and 420 is shown, or a similar connecting system. In particular, FIG. 34 shows a wedge-spring clip contact for terminal lugs, or a terminal lug application, e.g. for a high voltage power connection or a traction machine.

Only three contact points of the connecting system 400 are shown, by way of example, one of which is bisected. FIG. 34 is thus a combination of a perspective view and a sectional view. At each contact point, a terminal lug serving as the first contact partner 410 is secured to a socket serving as the second contact partner 420 by means of a spring clip 430. The second contact partner 420 is a least partially encased in an insulator 3425.

Figure 35:
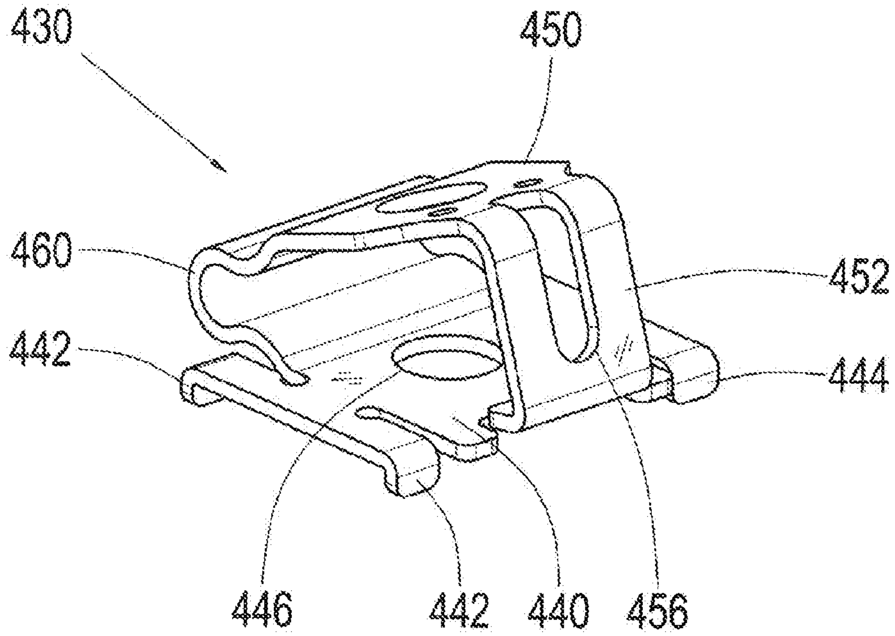
FIG. 35 shows a perspective view of a spring clip according to an exemplary embodiment of the present invention.

FIG. 35 shows a perspective view of a spring clip 430 according to an exemplary embodiment of the present invention. The spring clip 430 corresponds to the spring clip in any of the figures described above, with the exception that the spring clip 430 in FIG. 35 has a snap-fit hook 452, which is located on an end of the snap-fit section 450 facing away from the bending section 460, and two pairs of guide lugs 442 and 444, wherein a pair of guide lugs 442 and 444 is located on each of two opposite sides of the socket section 440. In other words, FIG. 35 shows a spring clip 430 with a single snap-fit hook 452 for a first contact partner in the form of a conductor bar.

A first pair of guide lugs 442 exhibits a first plane of extension for a first guide lug of the first pair of guide lugs 442, and a second plane of extension for a second guide lug of the first pair of guide lugs 442. The first plane of extension and the second plane of extension are parallel to one another. Furthermore, a first guide lug of the second pair of guide lugs 444 extends in the first plane of extension, and a second guide lug of the second pair of guide lugs 444 extends in the second plane of extension.

Figure 36:
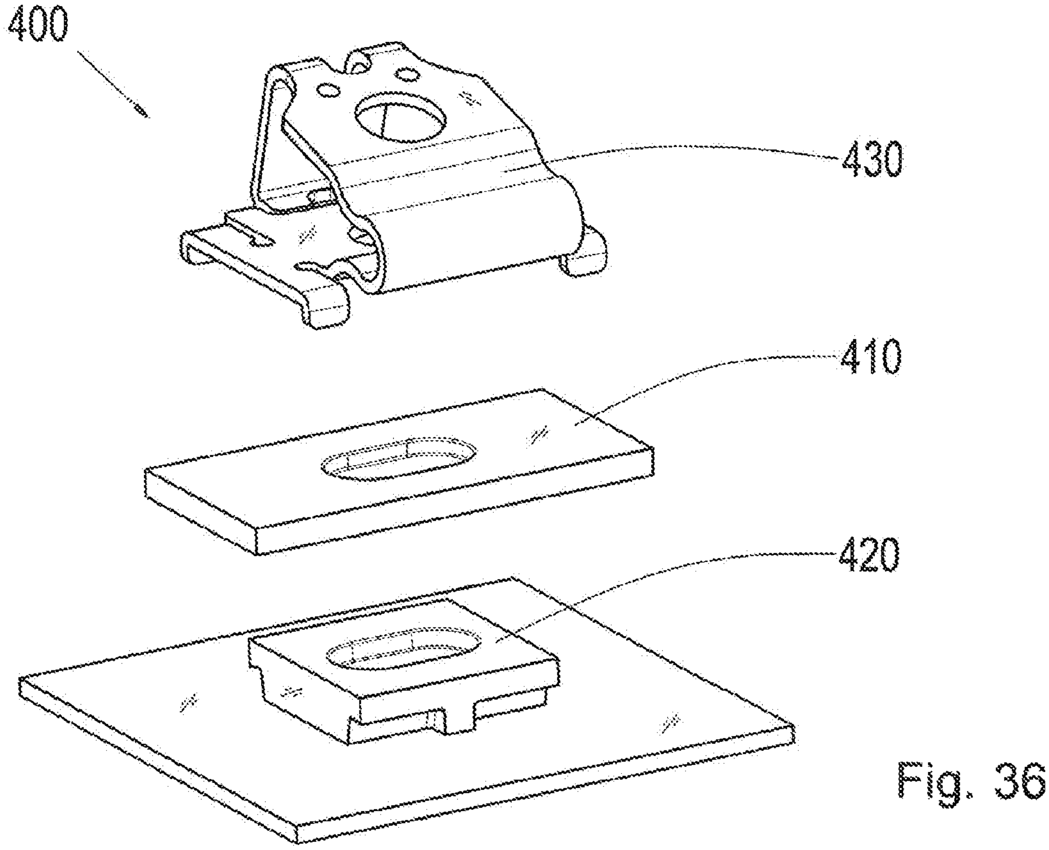
FIG. 36 shows an exploded view of a connecting system according to an exemplary embodiment of the present invention with the spring clip in FIG. 35.

FIG. 36 shows an exploded view of a connecting system 400 according to an exemplary embodiment of the present invention, with the spring clip 430 in FIG. 35. The connecting system 400 comprises the spring clip 430 in FIG. 35, a first contact partner 410 in the form of a conductor bar, and a second contact partner 420 in the form of a socket with a printed circuit board or a printed circuitry board. The connecting system 400 corresponds thereby to a connecting system in any of the figures described above, with the exception that the connecting sections of the contact partners 410 and 420 are each in the form of an elongated truncated cone.

Figure 37:
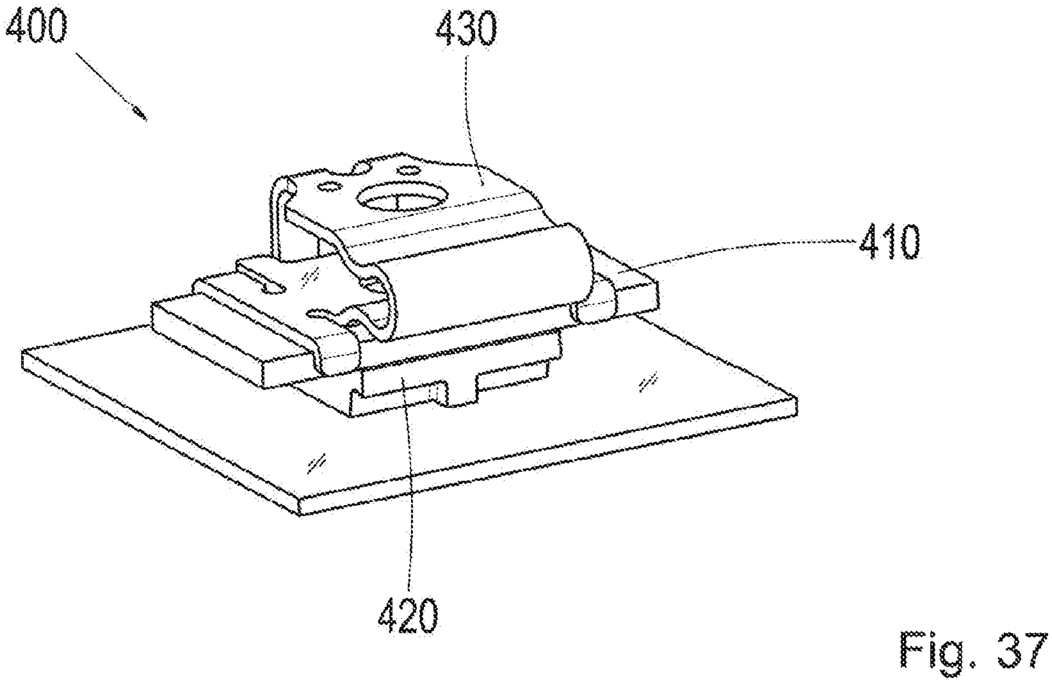
FIG. 37 shows a perspective view of the connecting system in FIG. 36, in an assembled state.

FIG. 37 shows a perspective view of the connecting system 400 in FIG. 36, in an assembled state. The first contact partner 410 and the second contact partner 420 are secured to one another by means of the spring clip 430 therein.

Figure 38:
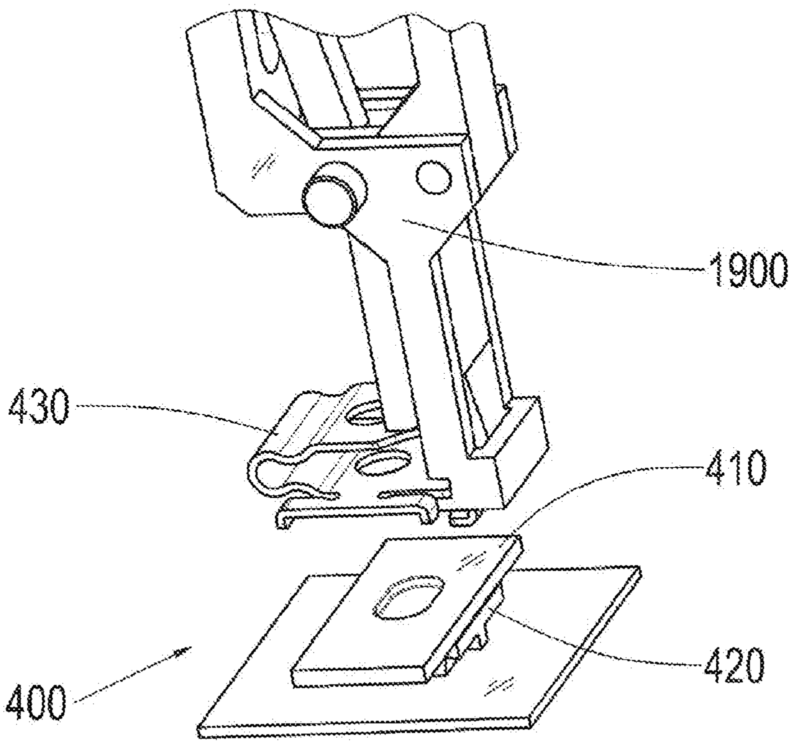
FIG. 38 shows a schematic illustration of a securing procedure for securing the contact partners and the connecting system in FIGS. 36 and 37 by means of the spring clip in any of the FIGS. 35 to 37.

FIG. 38 shows a schematic illustration of a securing procedure for securing the contact partners 410 and 420 in FIGS. 36 and 37 to one another by means of the spring clip 430 in any of the FIGS. 35 to 37. The securing procedure is carried out with an assembly tool 1900, which is the assembly tool in any of the figures described above, or a similar assembly tool. The spring clip 430 is received thereby in the assembly tool 1900. The contact partners 410 and 420 that are connected in a form fitting manner, can be secured to one another by means of the spring clip 430 and through the use of the assembly tool 1900.

Figure 39:
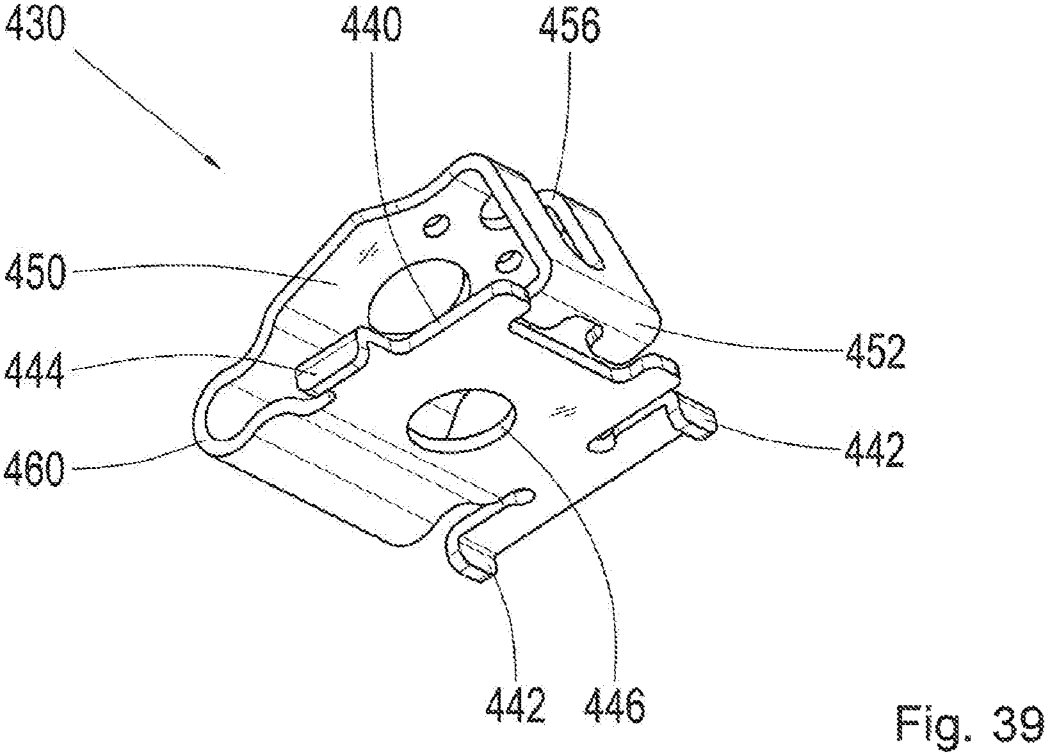
FIG. 39 shows a perspective view of a spring clip according to an exemplary embodiment of the present invention.

FIG. 39 shows a perspective view of a spring clip 430 according to an exemplary embodiment of the present invention. The spring claim 430 corresponds to the spring clip in FIG. 35 thereby, with the exception that the spring clip 430 in FIG. 39 has a pair of guide lugs 442 and one further guide lug 444, wherein the pair of guide lugs 442 is located on a first of two opposite sides of the socket section 440, and the other guide lug 444 is located on a second side of the two opposite sides of the socket section 440. In other words, FIG. 39 shows a spring clip 430 with a single snap-fit hook 452 for a first contact partner in the form of an end bar.

The pair of guide lugs 442 has a first plane of extension for a first guide lug of the pair of guide lugs 442 and a second plane of extension for the second guide lug of the pair of guide lugs 442. The first plane of extension and the second plane of extension are parallel to one another. Furthermore, the other guide lug 444 extends in another plane of extension, which is orthogonal to the first plane of extension and the second plane of extension.

Figure 40:
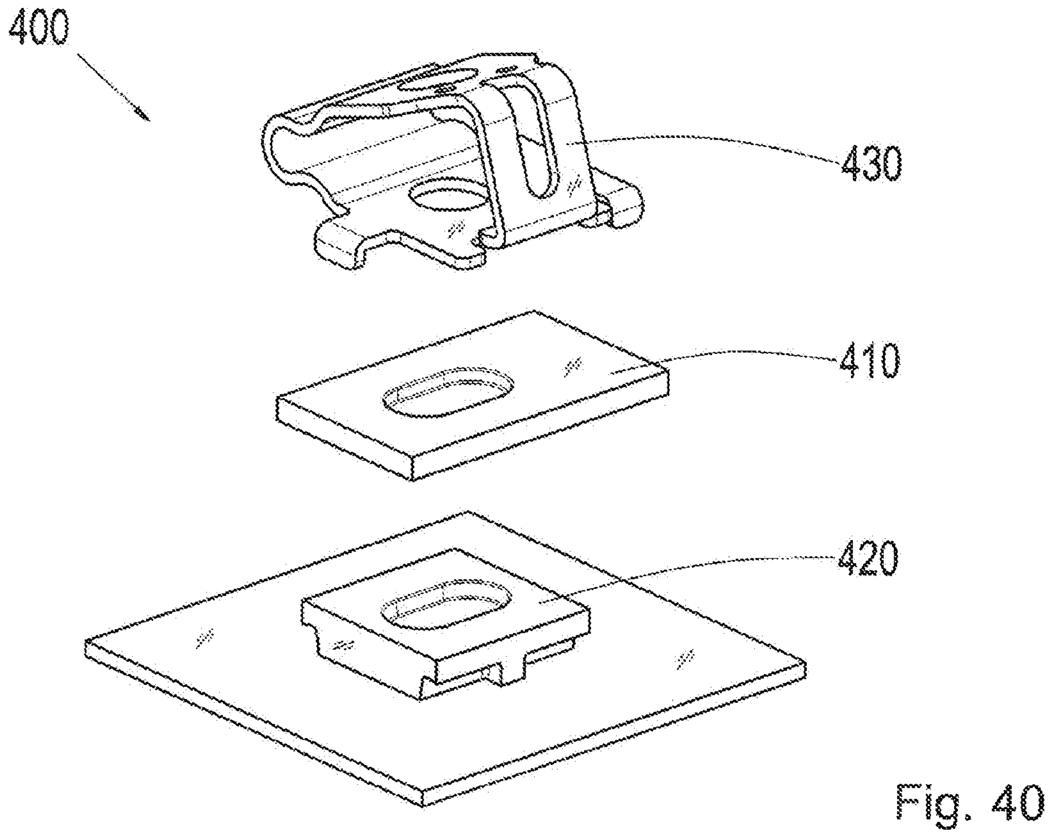
FIG. 40 shows an exploded view of a connecting system according to an exemplary embodiment of the present invention, with the spring clip in FIG. 39.

FIG. 40 shows an exploded view of a connecting system 400 according to an exemplary embodiment of the present invention, with the spring claim 430 in FIG. 39. The connecting system 400 comprises the spring clip 430 in FIG. 39, a first contact partner 410 in the form of an end bar, and a second contact partner 420 in the form of a socket with a printed circuit board, or printed circuitry board. The connecting system 400 corresponds to the connecting system in FIGS. 36, 37, and 38 thereby, with the exception that the spring clip in FIG. 39 is used, and the first contact partner 410 is in the form of an end bar.

Figure 41:
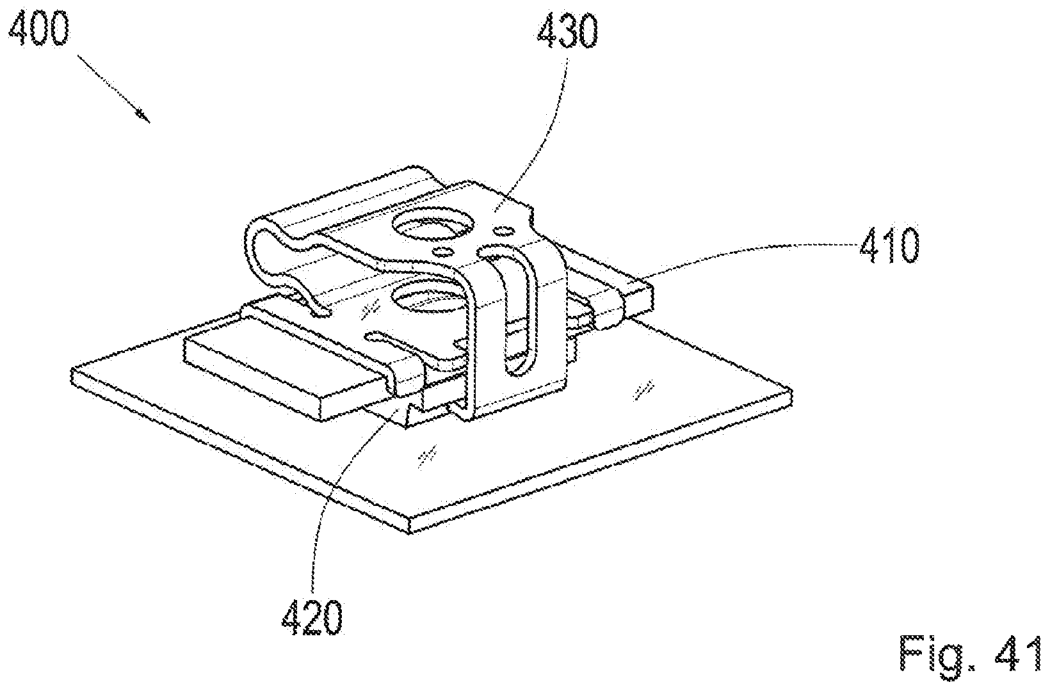
FIG. 41 shows a perspective view of the connecting system in FIG. 40, in the assembled state.

FIG. 41 shows a perspective view of the connecting system 400 in FIG. 40, in an assembled state. The first contact partner 410 and the second contact partner 420 are secured to one another therein by means of the spring clip 430.

Figure 42:
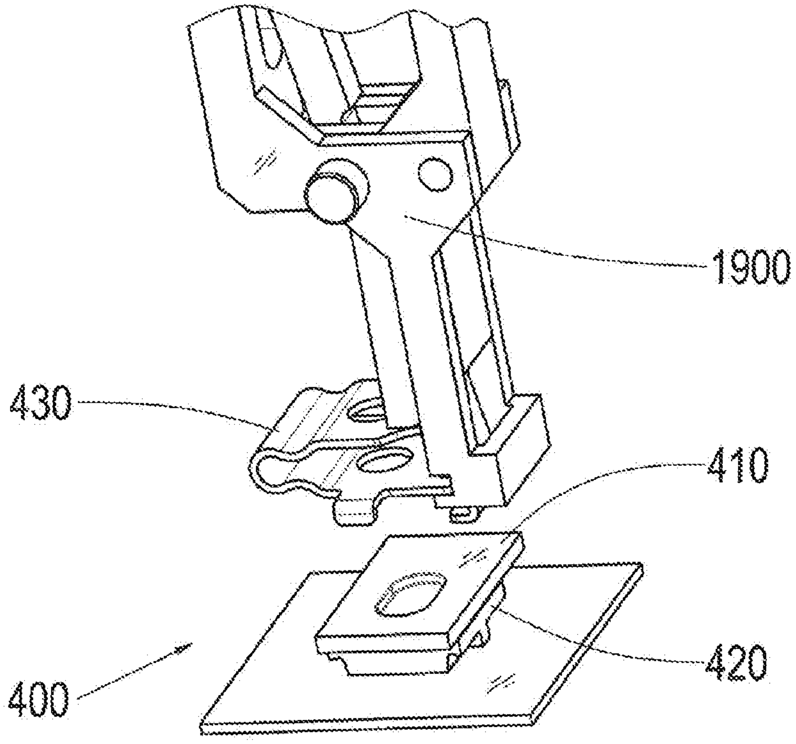
FIG. 42 shows a schematic illustration of a securing procedure for securing the contact partners in FIGS. 40 and 41 by means of the spring clip in any of the FIGS. 39 to 41.

FIG. 42 shows a schematic illustration of a securing procedure for securing the contact partners 410 and 420 in FIGS. 40 and 41, respectively, by means of the spring clip 430 in any of the FIGS. 39 to 41. The securing procedure takes place therein by means of an assembly tool 1900, which is the assembly tool in any of the figures described above, or a similar assembly tool. The spring clip 430 is received in the assembly tool 1900 thereby. The contact partners 410 and 420 that are connected to one another in a form fitting manner can be secured to one another by means of the spring clip 430 by using the assembly tool 1900.

Figure 43:
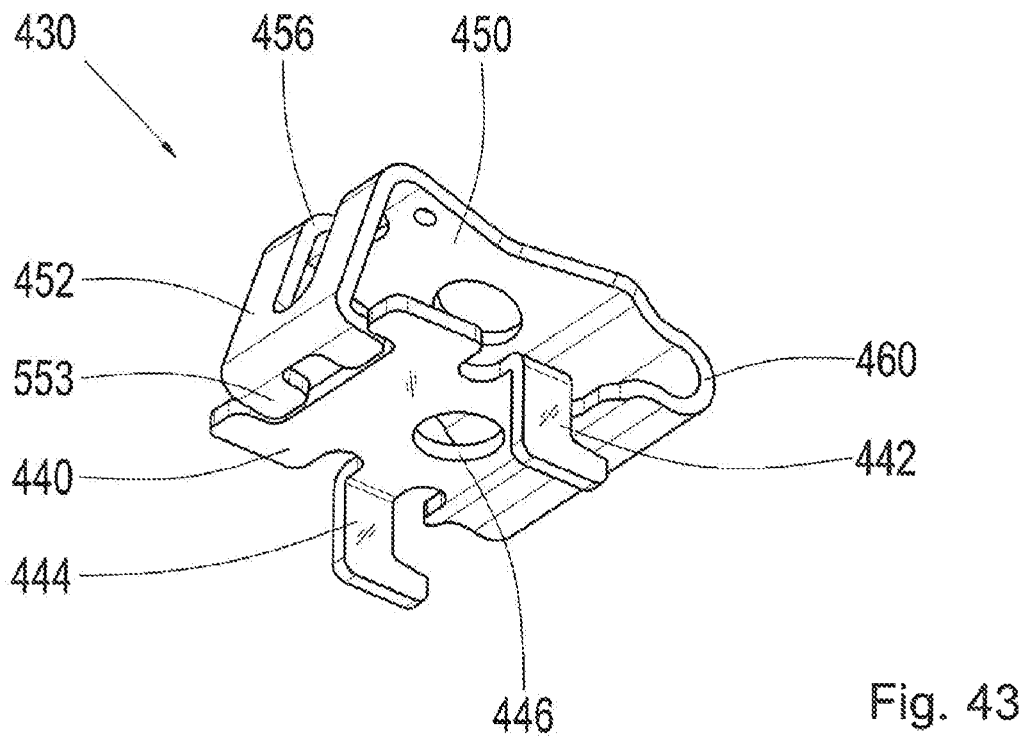
FIG. 43 shows a perspective view of a spring clip according to an exemplary embodiment of the present invention.

FIG. 43 shows a perspective view of a spring clip 430 according to an exemplary embodiment of the present invention. The spring clip 430 corresponds to the spring clip in any of the figures described above, with the exception that the spring clip 430 in FIG. 43 has a snap-fit hook 452 located on the end of the snap-fit section 450 facing away from the bending section 460, and two guide lugs 442 and 444, wherein one guide lug 442 and 444 is located on each of two opposite sides of the socket section 440, wherein each of the guide lugs 442 and 444 has an L-shaped or obtuse angled cross section, or an angled end section. The planes of extension of the guide lugs 442 and 444 are parallel to one another. In other words, FIG. 43 shows a spring clip 430 with a tilting and slipping safeguard.

Figure 44:
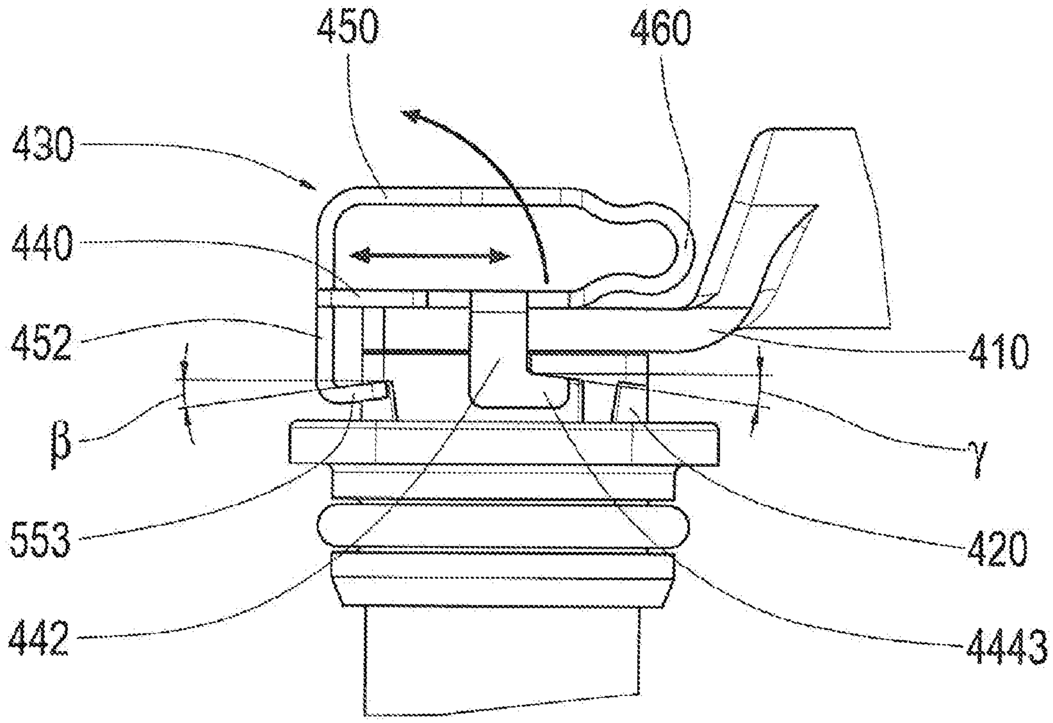
FIG. 44 shows a sectional view of a connecting system according to an exemplary embodiment of the present invention, with the spring clip in FIG. 43.

FIG. 44 shows a side view of a connecting system 400 according to an exemplary embodiment of the present invention, with the spring clip 430 in FIG. 43. The connecting system 400 is shown therein in the assembled state, wherein a first contact partner 410 in the form of a terminal lug is secured to a second contact partner 420 in the form of a socket by means of the spring clip 430.

Only one guide lug 442 of the two guide lugs in the spring clip 430 is visible in the side view in FIG. 44. The guide lug 442 has an angled end section 4443. The guide lug 442 with the end section 4443 is bent therein to form an L-shape or L-like cross section. It can furthermore be seen in the side view in FIG. 44 that the snap-fit hook 452 of the spring clip 430 has a hook section 553 bent beyond 90°. A bending angle $\beta$ of the hook section 553 subtracted from 90° is indicated in FIG. 44. A slanting angle $\gamma$ is also indicated, illustrating the angle of a slanted flank of the angled end section 4443 of the guide lug 442.

In accordance with an exemplary embodiment, both the bending angle $\beta$ and the slanting angle $\gamma$ are each 8°. According to another exemplary embodiment, the bending angle $\beta$ and the slanting angle $\gamma$ can deviate therefrom.

Figure 45:
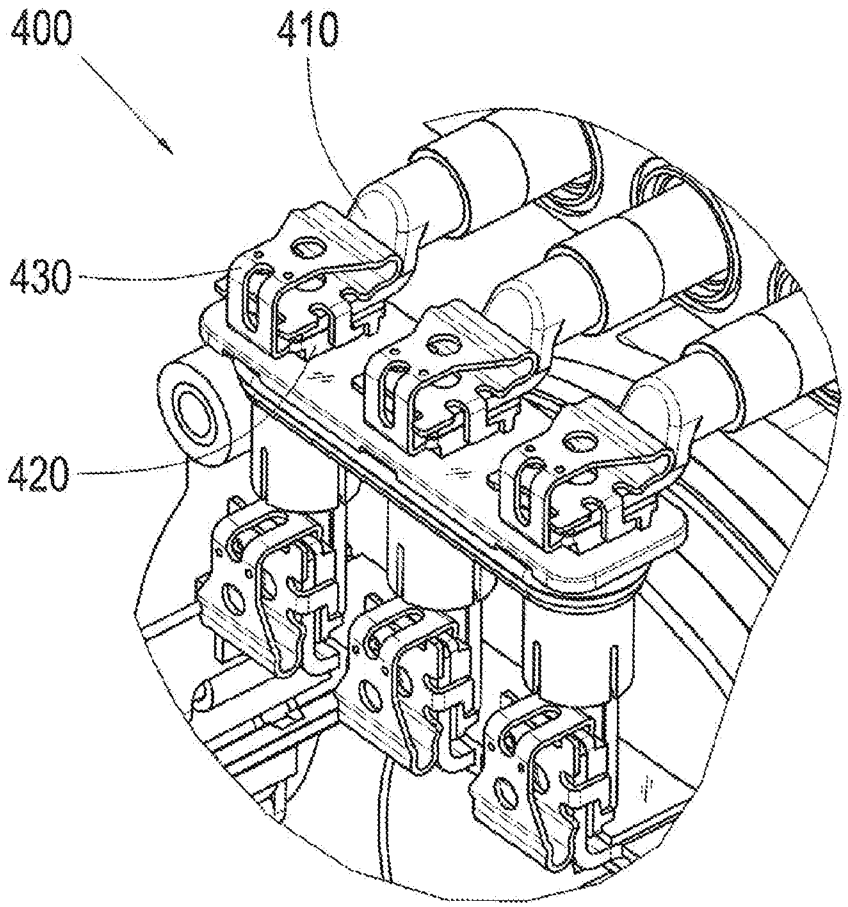
FIG. 45 shows a perspective view of the connecting system in FIG. 44.

FIG. 45 shows a perspective view of the connecting system 400 in FIG. 44. FIG. 45 shows a larger section or portion of the connecting system 400 with numerous contact points, wherein only one contact point is shown in the sectional illustration in FIG. 44.

Figure 46:
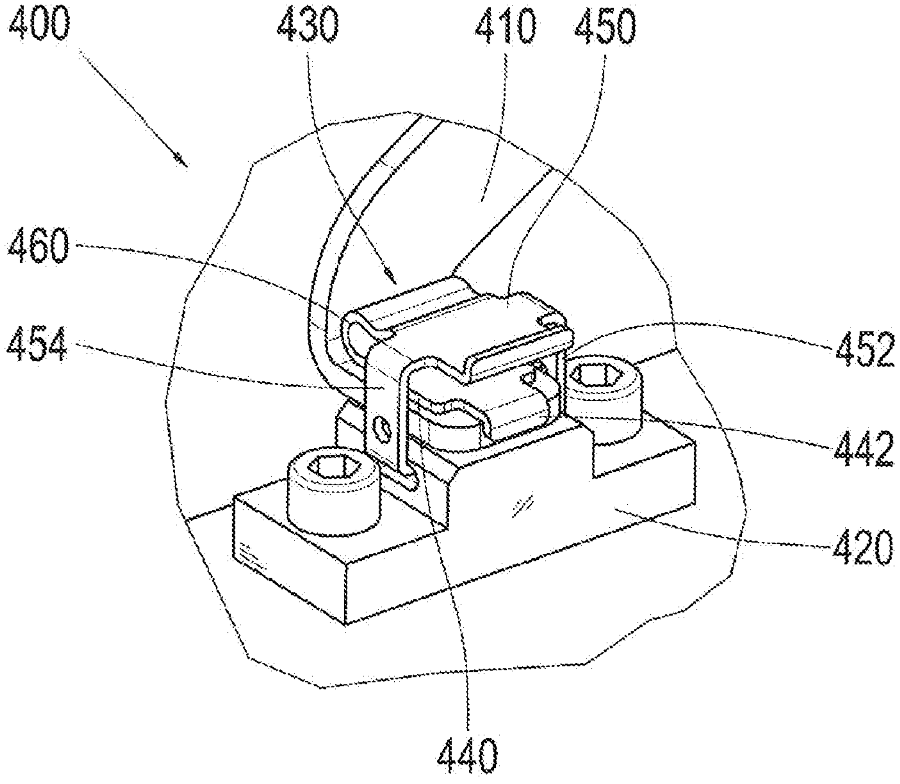
FIG. 46 shows a perspective view of a connecting system according to an exemplary embodiment of the present invention.

FIG. 46 shows a perspective view of a connecting system 400 according to an exemplary embodiment of the present invention. The connecting system 400 is similar to a connecting system in any of the preceding figures. The connecting system 400 has a first contact partner 410 in the form of a bus bar, a second contact partner 420 in the form of a socket, and a spring clip 430, by means of which the first contact partner 410 and the second contact partner 420 are secured to one another.

The spring clip 430 corresponds to the spring clip in any of the FIGS. 4 to 34, with the exception that the spring clip 430 has only one guide lug 442, located on an end of the socket section 440 facing away from the bending section, that the snap-fit hooks 452 and 454 are continuous, or free of holes, and that the socket section 440 is continuous, or free of any coupling sections. In other words, the spring clip 430 is a simplified version of any of the spring clips in any of the FIGS. 4 to 34.

Figure 47:
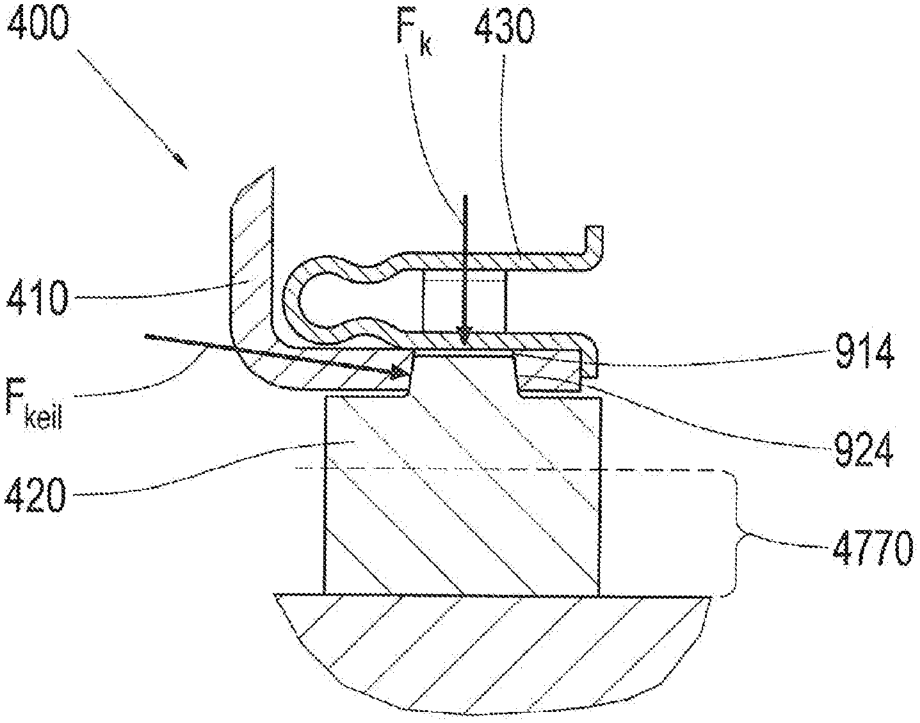
FIG. 47 shows a sectional view of a connecting system according to an exemplary embodiment of the present invention.

FIG. 47 shows a sectional view of a connecting system 400 according to an exemplary embodiment of the present invention. The connecting system 400 corresponds to the connecting system in FIG. 46, with the exception that a subsection 4470 of the socket is also indicated on the socket, or second contact partner 420, which, unlike with a screw connection, is unnecessary. The unnecessary subsection 4770 represents a height, which is unnecessary in comparison with a screw contact.

The first contact partner 410 and the second contact partner 420 are each comprised of a very conductive material. The sectional view in FIG. 47 furthermore shows a first connecting section 914 of the first contact partner 410 in the form of a through hole, and a second connecting section 924 of the second contact partner 420 in the form of a wedge or truncated cone projection. Furthermore, a contact force Fk and a wedge force Fkeil, are also indicated. The contact force Fk acts in the joining direction for the first contact partner 410 and second contact partner 420. The wedge force Fkeil acts at a right angle to a slanted wedge surface. The wedge forms a form fitting connection perpendicular, or at a right angle to the joining direction, and increases the contact force Fk due to the wedge force Fkeil. The contact force Fk can be 300 N, purely by way of example, and the wedge force Fkeil can be 600 N, by way of example.

In other words, FIG. 47 shows a spring-wedge contact for the connecting system 400. The wedge can be a truncated cone or pyramid therein, in the form of a wedge toothing running longitudinally, transversely, diagonally, etc. or suchlike.

Figure 48:
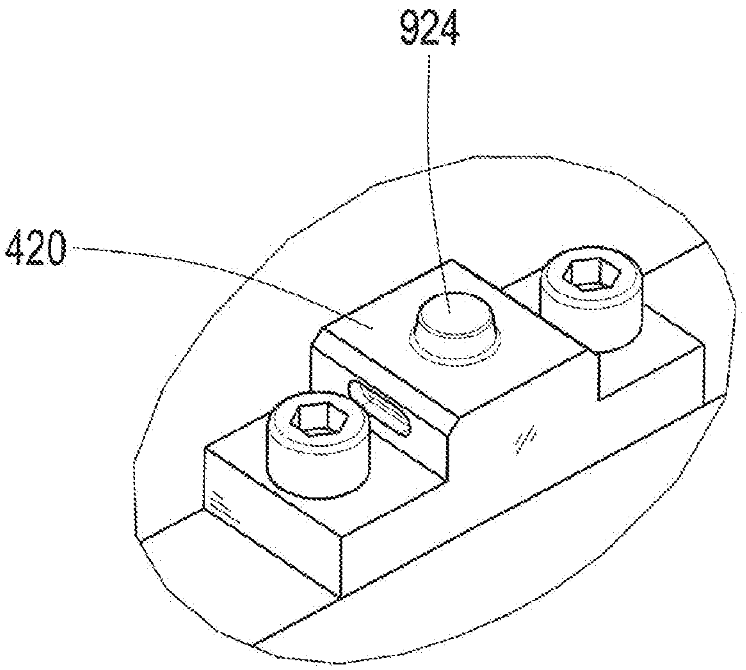
FIGS. 48 to 52 show schematic illustrations of the course of an assembly of the connecting systems in FIGS. 46 and 47.
Figure 49:
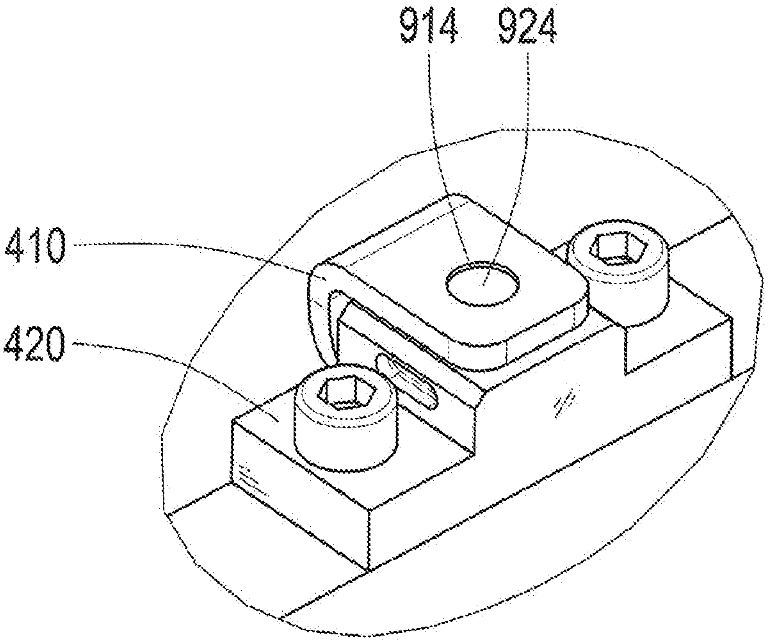
Figure 50:
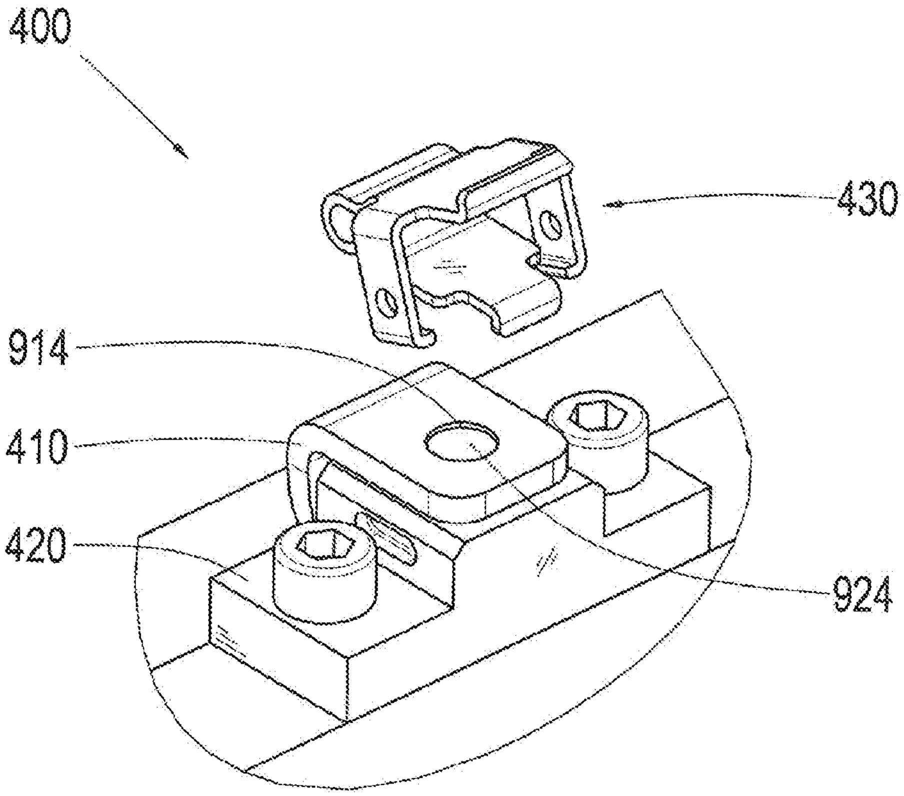
Figure 51:
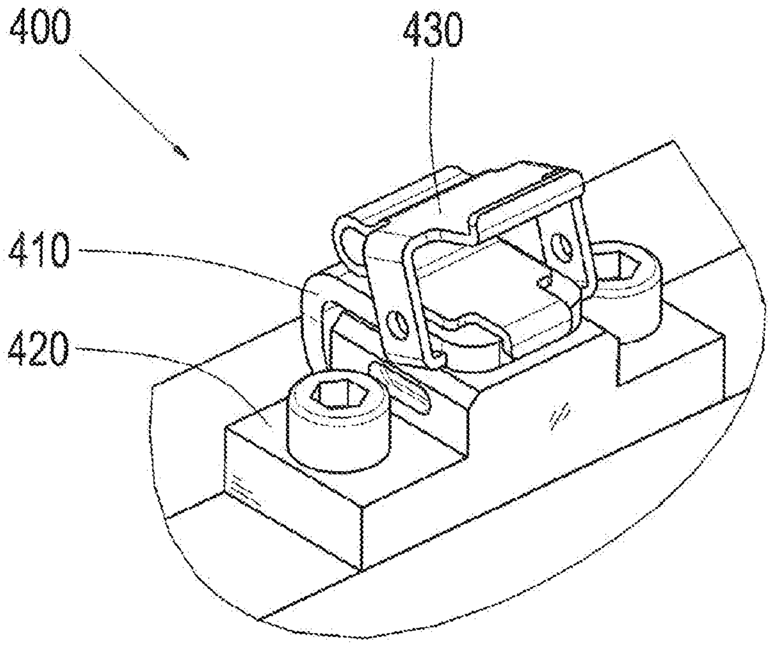
Figure 52:
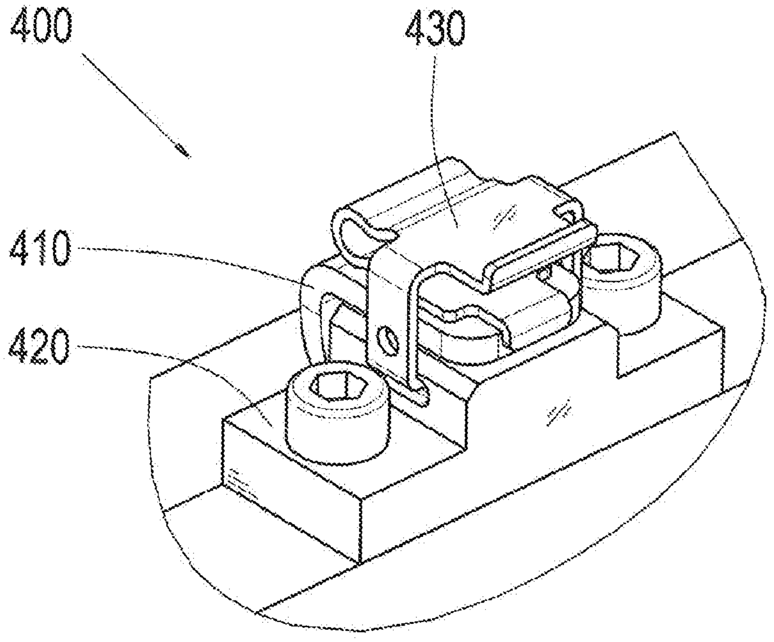

FIGS. 48 to 52 show schematic illustrations relating to the assembly of the connecting system 400 in FIGS. 46 and 47. FIG. 48 shows an exemplary starting state or initial assembly state, in which the second contact partner 420 that has the second connecting section 924 is provided. FIG. 49 shows a second assembly state, in which the first contact partner 410, or the bus bar, is brought into position, or connected to the second contact partner 420 in a form fitting manner. The first connecting section 914 of the first contact partner 410 and the second connecting section 924 of the second contact partner 420 are connected to one another in a form fitting manner thereby. FIG. 50 shows a third assembly state, in which the spring clip 430, or clip, respectively, is brought into position. FIG. 51 shows a fourth assembly state, in which the spring clip 430 is placed on the contact partners 410 and 420. FIG. 52 shows a fifth assembly state, in which the spring clip 430 is tacked down, or snapped in place, and the contact partners 410 and 420 are secured to one another by means of the spring clip 430.

Figure 53:
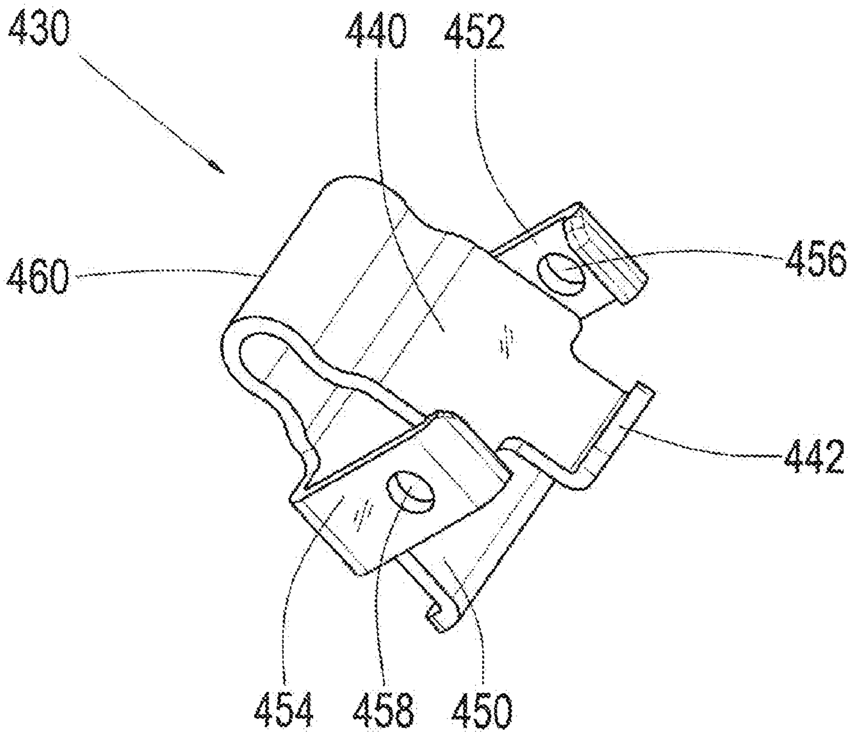
FIG. 53 shows a perspective view of a spring clip according to an exemplary embodiment of the present invention.

FIG. 53 shows a perspective view of a spring clip 430 according to an exemplary embodiment of the present invention. The spring clip 430 therein corresponds to the spring clip in FIGS. 46 to 52, with the exception that round through holes 456 and 458 are formed, by way of example, in the snap-fit hooks 452 and 454. The first through hole 456 is formed in the first snap-fit hook 452, and the second through hole 458 is formed in the second snap-fit hook 454. The through holes 456 and 458 are holes for an assembly aid or assembly tool for spreading the snap-fit hooks 452 and 454, or the retaining arms. The assembly aid or assembly tool is configured for tacking down the spring clip 430, or clamp spring.

FIGS. 54 to 57 show side views of a connecting system 400 according to an exemplary embodiment of the present invention, with the spring clip 430 in FIG. 53. The connecting system 400 therein is similar to the connecting system in any of the FIGS. 46 to 52.

Figure 54:
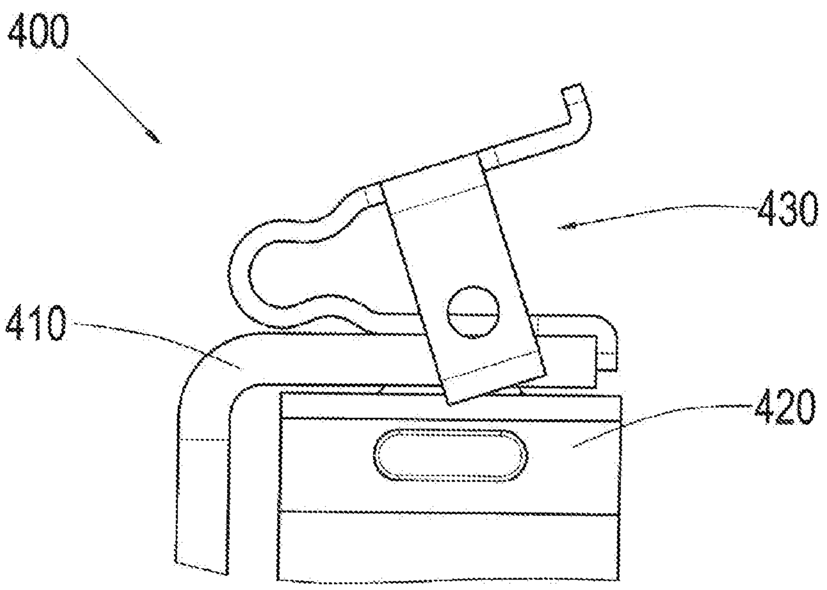
FIGS. 54 to 57 shows side views of a connecting system according to an exemplary embodiment of the present invention, with the spring clip in FIG. 53.
Figure 55:
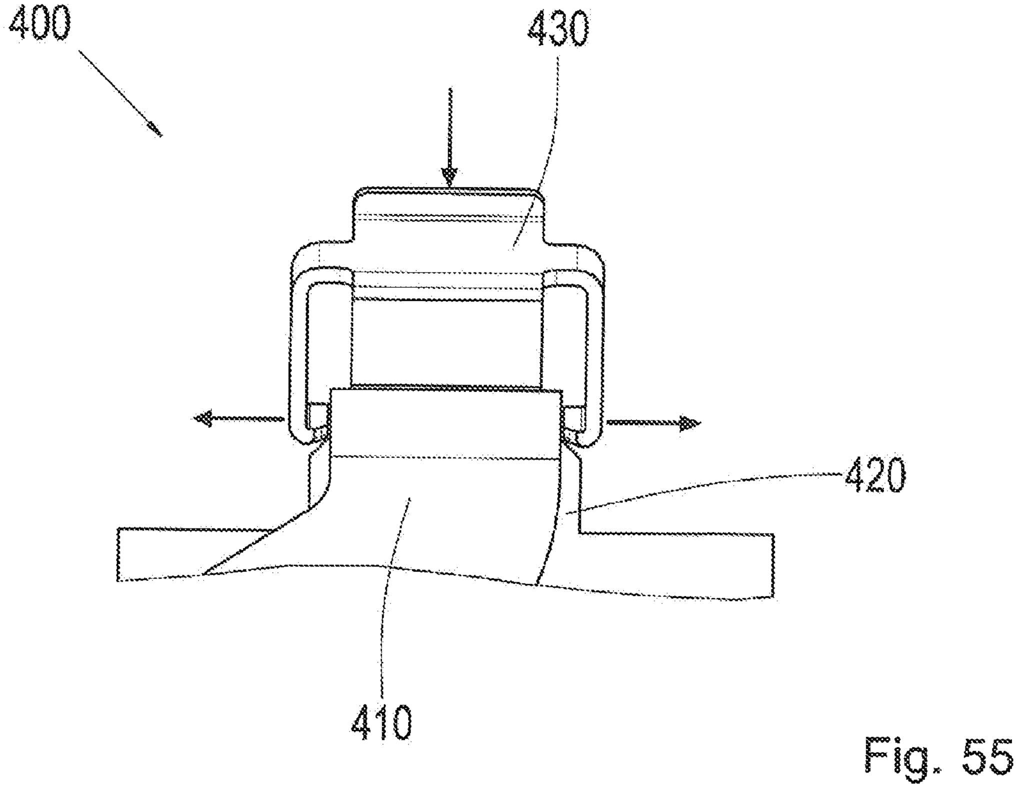

FIGS. 54 and 55 show the connecting system 400 corresponding to the fourth assembly state shown in FIG. 51, in which the spring clip 430 is placed on the contact partners 410 and 420, wherein the spring clip is open, or the bending section is in a relaxed state. Two opposing arrows in FIG. 55 indicate a movement for deflecting the snap-fit hooks of the spring clip 430 and an arrow pointing toward the spring clip 430 indicates a movement for tensioning the bending section of the spring clip 430.

Figure 56:
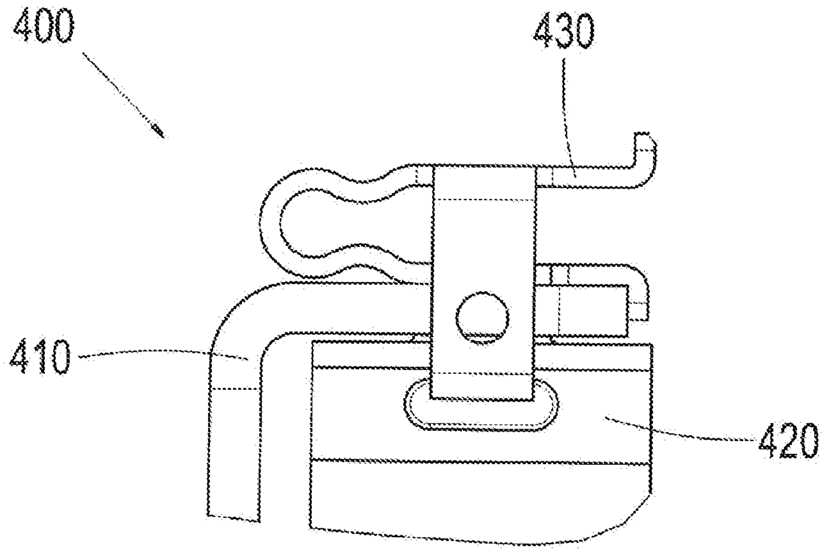
Figure 57:
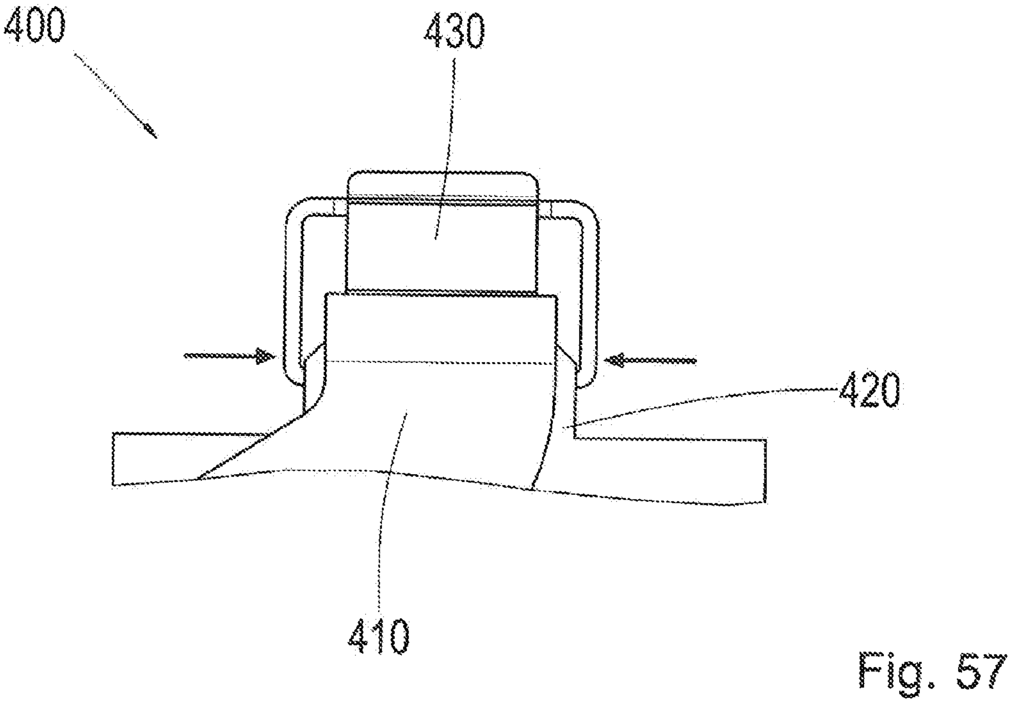

FIGS. 56 and 57 show the connecting system 400 corresponding to the fifth assembly state shown in FIG. 52, in which the spring clip 430 is closed, or its bending section is tensioned, wherein the snap-fit hooks are snapped into the second contact partner 420. Two opposing arrows in FIG. 57 indicate a movement for releasing the snap-fit hooks of the spring clip 430.

By using the connecting system 400 in FIGS. 54 to 57, friction or tension while taking the spring clip 430 can be avoided, in that the snap-fit hooks, or retaining arms, of the spring clip 430 are spread using an assembly aid or assembly tool. The spreading of the snap-fit hooks takes place here without the participation of the second contact partner 420, or the socket, respectively.

Figure 58:
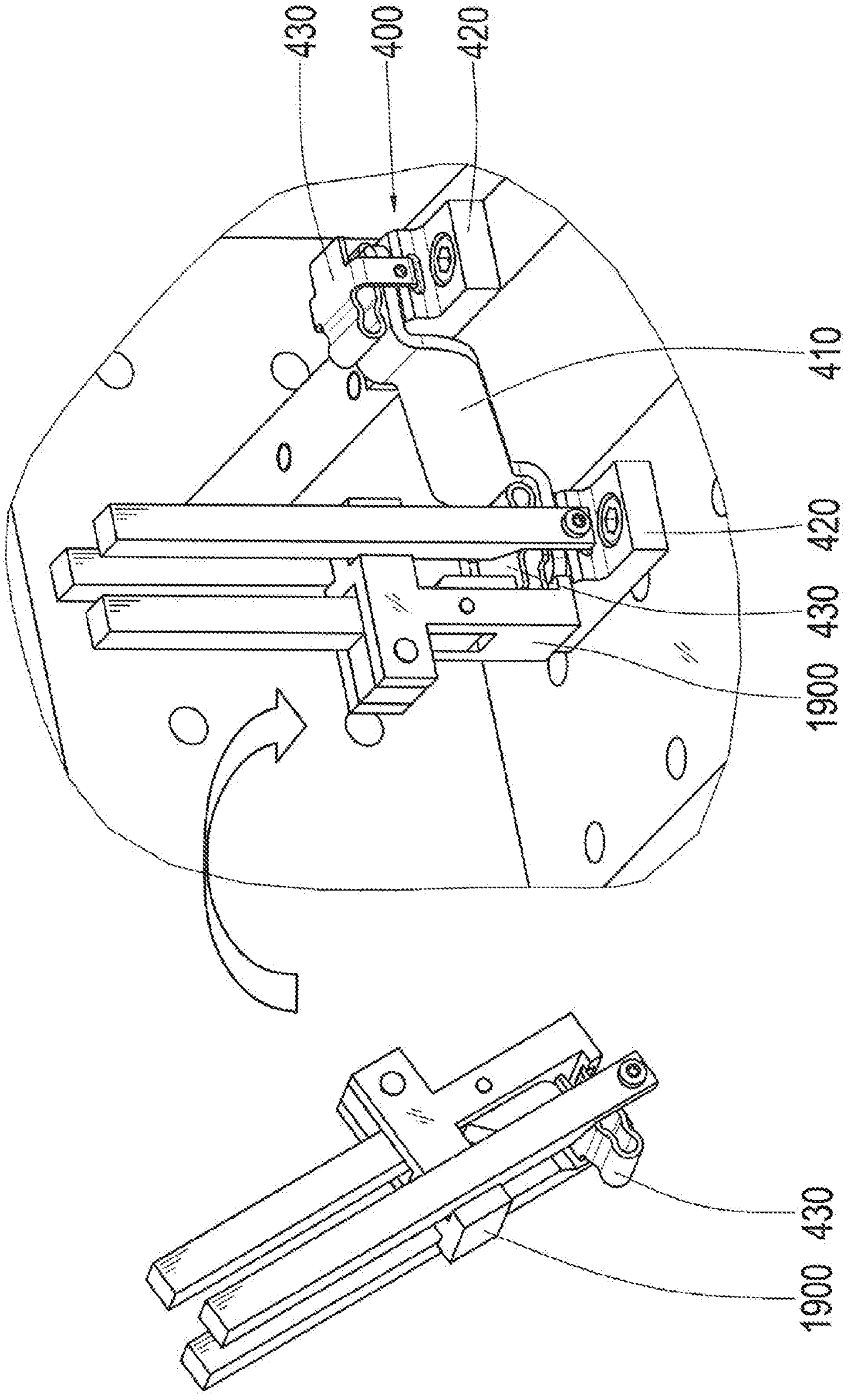
FIG. 58 shows a perspective view of the assembly of the spring clip in FIGS. 53 to 57 for a connecting system according to an exemplary embodiment of the present invention by means of an assembly tool.

FIG. 58 shows a perspective view of the installation of the spring clip 430 in FIGS. 53 to 57, for a connecting system 400 according to an exemplary embodiment of the present invention by means of an assembly tool 1900. The assembly tool 1900 is the assembly tool in FIGS. 19 to 21, by way of example. The assembly tool 1900 facilitates a gentle, effortless installation of the spring clip 430.

The assembly tool 1900 with the spring clip 430 therein is shown in a first detail illustration in FIG. 58. The assembly tool 1900 is shown with the spring clip 430 and the connecting system in a second detail illustration of FIG. 58, connected to the first detail illustration via an arrow indicating the assembly. The connecting system 400 has two contact points. The assembly tool 1900 is located with the spring clip 430 in the region of the first contact point in one of the assembly procedures. A first contact partner 410 and a second contact partner 420 are secured to one another by means of another spring clip 430 at the second contact point of the connecting system 400. The two contact points are connected electrically via the first contact partner 410.

Advantages of the exemplary embodiments of the present invention shall be summarized and explained otherwise below in reference to FIGS. 4 to 58.

The contact partners 410 and 420, which have a contact bar, bus bar, terminal lug, etc. serving as the first contact partner, are attached, or secured, above one another or on a stationary socket, or mount, in a housing or on a printed circuit board, by means of a spring clip 430. The contact surfaces subjected to pressure by the spring clip 430 can form different variations of wedges, e.g. a transverse or diagonal wedge toothing, a truncated cone or pyramid, etc. This results in a reliable, form fitting connection perpendicular to the joining direction. Furthermore, the contact force Fk, or the force perpendicular to the contact surface, is increased due to the wedge by the reinforcement factor V with respect to a spring force of the spring clip 430, depending on the wedge angle $\alpha$ and the frictional value $\mu$. One advantage of a connecting system 400 with a spring-wedge contact is, in particular, the electrical connection of weak, highly conductive materials with low slippage resistance. In particular, the advantage of a low structural height of the connecting system 400 can also be obtained. In contrast to a screw contact, the unnecessary subsection 4770, otherwise needed for clamp lengths and screw depths, is not necessary with the connecting system 400. The connecting system 400 can also be assembled in a gentle, effortless or easy manner, that is also safe.

The exemplary embodiments described above and illustrated in the Figures are selected only by way of example. Different exemplary embodiments can be combined with one another, entirely or with respect to individual features. Furthermore, one exemplary embodiment can be supplemented by features of another exemplary embodiment.

Furthermore, the method steps according to the invention can be repeated or executed in another sequence than that in the description.

If an exemplary embodiment comprises an "and/or" conjunction between a first feature and a second feature, this can be read to mean that both the first feature and the second feature are contained in one embodiment of the exemplary embodiment, and that another embodiment contains either only the first feature or only the second feature.

REFERENCE SYMBOLS

100 screw contact
110 first contact partner

120 second contact partner
130 screw
140 washer
Fk force, or contact force
300 electrical connection
302 electric machine
304 power electronics
306 high voltage cable connection
400 connecting system
410 first contact partner
420 second contact partner
422 coupling section
430 spring clip
440 socket section
442 guide lug, pair of guide lugs
444 guide lug, pair of guide lugs
446 coupling section
450 snap-fit section
452 snap-fit hook
454 snap-fit hook
456 first through hole
458 second through hole
460 bending section
553 first hook section
555 second hook section
Fa pressure force
914 first connecting section
924 second connecting section
α wedge angle
Fs contact force
1200 securing method
1210 positioning step
1220 deflection step
1230 tensioning step
1305 printed circuit board
1900 assembly tool
1910 first lever
1920 second lever
1930 mount
1940 bearing pin
1950 securing pin
1960 guide shoe
3425 insulator
4443 end section
β bending angle
γ slanting angle
Fkeil wedge force
4770 unnecessary subsection

What is claimed is:

1. A spring clip for securing contact partners, wherein the contact partners can be connected electrically and in a form fitting manner to one another, the spring clip comprising:

a socket section with at least one guide lug for a form fitting connection to a first contact partner;

a snap-fit section with at least one snap-fit hook that snaps into a second contact partner; and a bending section between the socket section and the snap-fit section, wherein the bending section can be bent between a relaxed state and a tensioned state, and wherein the spring clip is shaped such that it has a first V-shaped cross section in the relaxed state, which changes to a second U-shaped cross section in the tensioned state, wherein the at least one guide lug is formed, projecting from a side of the socket section facing away from the snap-fit section, wherein the at least one snap-fit hook comprises an arm including a proximate end directly connected to the snap-fit section and a distal end including a hook section, wherein the arm of the at least one snap-fit hook projects from a side of the snap-fit section facing toward the socket section and projects in a same direction as the at least one guide lug when the bending section is tensioned, wherein the hook section is bent 90° or more inward toward a center of the socket section relative to the arm to engage with the second contact partner, wherein the arm extends beyond the socket section such that the hook section is on the side of the socket section facing away from the snap-fit section at least when the bending section is tensioned, and wherein the socket section comprises at least one hole configured to receive a coupling section of at least one of the first contact partner or the second contact partner.

2. The spring clip of claim 1, wherein the at least one snap-fit hook has a through hole for coupling to an assembly tool for deflecting the at least one snap-fit hook.

3. The spring clip of claim 1, wherein the at least one guide lug has a bent end section; and wherein the at least one guide lug has an L-shaped or obtuse angled cross section.

4. The spring clip of claim 1, wherein the at least one guide lug is located on an end of the socket section facing away from the bending section; and wherein there is at least one snap-fit hook located on each of two opposite sides of the snap-fit section.

5. The spring clip of claim 1, wherein the at least one snap-fit hook is located on an end of the snap-fit section facing away from the bending section; and wherein at least one guide lug is located on each of two opposite sides of the socket section.

6. The spring clip of claim 1, wherein the at least one guide lug comprises a plurality of guide lugs; and wherein each of the plurality of guide lugs extends away from the socket section in a respective plane of extension, and wherein at least two of the planes of extension of at least two of the plurality of guide lugs are parallel to one another.

7. A connecting system for producing an electrical and mechanical connection between first and second contact partners, the connecting system comprising:

the spring clip of claim 1;

wherein the first contact partner and the second contact partner can be connected to one another electrically and in a form fitting manner;

wherein the first contact partner and the second contact partner can be mechanically secured to one another; and wherein the first contact partner is located between the second contact partner and the spring clip when in a mechanically secured state.

8. The connecting system of claim 7, wherein at least one of the first contact partner or the second contact partner has at least one coupling section for a form fitting connection to a coupling section of the socket section of the spring clip.

9. The connecting system of claim 7, wherein the first contact partner has at least one first connecting section, and the second contact partner has at least one second connecting section; and wherein the at least one first connecting section and the at least one second connecting section are complementary to one another, such that they can be connected to one another in a form fitting manner.

10. The connecting system of claim 9, wherein the at least one first connecting section and the at least one second connecting section are formed as complementary recesses and projections; and wherein the cross sections of the at least one first connecting section and the at least one second connecting section are rectangular or in the shape of a truncated cone.

11. A method of using a spring clip for securing contact partners, wherein the method is executed in conjunction with the spring clip comprising:

a socket section with at least one guide lug for a form fitting connection with a first contact partner;

a snap-fit section with at least one snap-fit hook that snaps into a second contact partner;

a bending section between the socket section and the snap-fit section, wherein the bending section can be bent between a relaxed state and a tensioned state, and wherein the spring clip is shaped such that it has a first V-shaped cross section in the relaxed state, which changes to a second U-shaped cross section in the tensioned state, wherein the at least one guide lug is formed, projecting from a side of the socket section facing away from the snap-fit section, wherein the at least one snap-fit hook comprises an arm including a proximate end directly connected to the snap-fit section and a distal end including a hook section, wherein the arm of the at least one snap-fit hook projects from a side of the snap-fit section facing toward the socket section and projects in a same direction as the at least one guide lug when the bending section is tensioned, wherein the hook section is bent 90° or more inward toward a center of the socket section relative to the arm to engage with the second contact partner, wherein the arm extends beyond the socket section such that the hook section is on the side of the socket section facing away from the snap-fit section at least when the bending section is tensioned, and wherein the socket section comprises at least one hole configured to receive a coupling section of at least one of the first contact partner or the second contact partner, the method comprising:

placing the spring clip with the socket section on the first contact partner, which is connected to the second contact partner electrically and in a form fitting manner, in order to produce a form fitting connection between the at least one guide lug of the socket section of the spring clip and the first contact partner; and deflecting the at least one snap-fit hook of the snap-fit section of the spring clip and snapping the at least one snap-fit hook into the second contact partner, wherein the bending section of the spring clip becomes tensioned.

12. The spring clip of claim 4, wherein the at least one snap-fit hook has a through hole for coupling to an assembly tool for deflecting the at least one snap-fit hook.

13. The spring clip of claim 1, wherein the at least one guide lug comprises a plurality of guide lugs; and wherein each of the plurality of guide lugs extends away from the socket section in a respective plane of extension, and wherein at least two of the planes of extension of at least two of the plurality of guide lugs are orthogonal to one another.

14. The spring clip of claim 1, wherein the at least one guide lug comprises at least a first guide lug, a second guide lug, and a third guide lug; and wherein the first guide lug extends away from the socket section in a first plane of extension, the second guide lug extends away from the socket section in a second plane of extension, and the third guide lug extends away from the socket section in third plane of extension, and wherein the first plane of extension is parallel to the second plane of extension and is orthogonal to the third plane of extension.

* * * * *